US012595051B2

(12) United States Patent

Manning et al.

(10) Patent No.: US 12,595,051 B2
(45) Date of Patent: Apr. 7, 2026

(54) SYSTEMS AND METHODS FOR RETRACTING LIFT PROPELLER IN eVTOL AIRCRAFT

(71) Applicant: Archer Aviation Inc., San Jose, CA (US)

(72) Inventors: Kerry Manning, Parker, CO (US); Nathan Storrs, Woodinville, WA (US); Scott Graves, Felton, CA (US)

(73) Assignee: Archer Aviation Inc., San Jose, CA (US)

( * ) Notice: Subject to any disclaimer, the term of this patent is extended or adjusted under 35 U.S.C. 154(b) by 169 days.

(21) Appl. No.: 18/477,220

(22) Filed: Sep. 28, 2023

(65) Prior Publication Data

US 2025/0042544 A1 Feb. 6, 2025

Related U.S. Application Data

(63) Continuation of application No. 18/324,702, filed on May 26, 2023, now Pat. No. 11,827,349.

(51) Int. Cl.
*B64C 29/00* (2006.01)
*B64C 11/02* (2006.01)
(Continued)

(52) U.S. Cl.
CPC .......... *B64C 29/0033* (2013.01); *B64C 11/02* (2013.01); *B64D 27/24* (2013.01); *B64D 27/40* (2024.01)

(58) Field of Classification Search
CPC ..... B64C 29/0033; B64C 11/02; B64C 27/30; B64C 27/32; B64C 29/0025; B64D 27/24;
(Continued)

(56) References Cited

U.S. PATENT DOCUMENTS

| | | |
|---|---|---|
| 10,894,599 B1 | 1/2021 | Popiks |
| 11,001,377 B1 | 5/2021 | Robinson et al. |

(Continued)

FOREIGN PATENT DOCUMENTS

| | | | | |
|---|---|---|---|---|
| CA | 3080950 A1 * | 5/2019 | ............... | B64C 1/26 |
| DE | 102021210239 A1 | 6/2022 | | |

(Continued)

OTHER PUBLICATIONS

International Search Report and Written Opinion of the International Search Authority in counterpart International Application No. PCT/US2023/081352 dated Mar. 1, 2024 (26 pages).

*Primary Examiner* — Assres H Woldemaryam
(74) *Attorney, Agent, or Firm* — Finnegan, Henderson, Farabow, Garrett & Dunner, LLP

(57) ABSTRACT

A VTOL aircraft includes a lift propeller configured to provide lift during takeoff, landing and hover operations. The lift propeller is configured to be stowed close to a boom surface when not in use during, e.g., cruise flight, to minimize drag around propeller surfaces. The lift propeller may be displaced vertically with respect to the boom when switching to a lift configuration to provide greater separation from the boom to improve lift efficiency and reduce unwanted vibrations. The lift propeller may have a fail-safe configuration that allows the propeller to move passively between lift and stowed configurations, and to fully rotate even when fully retracted.

20 Claims, 31 Drawing Sheets

500

Figure 1A:
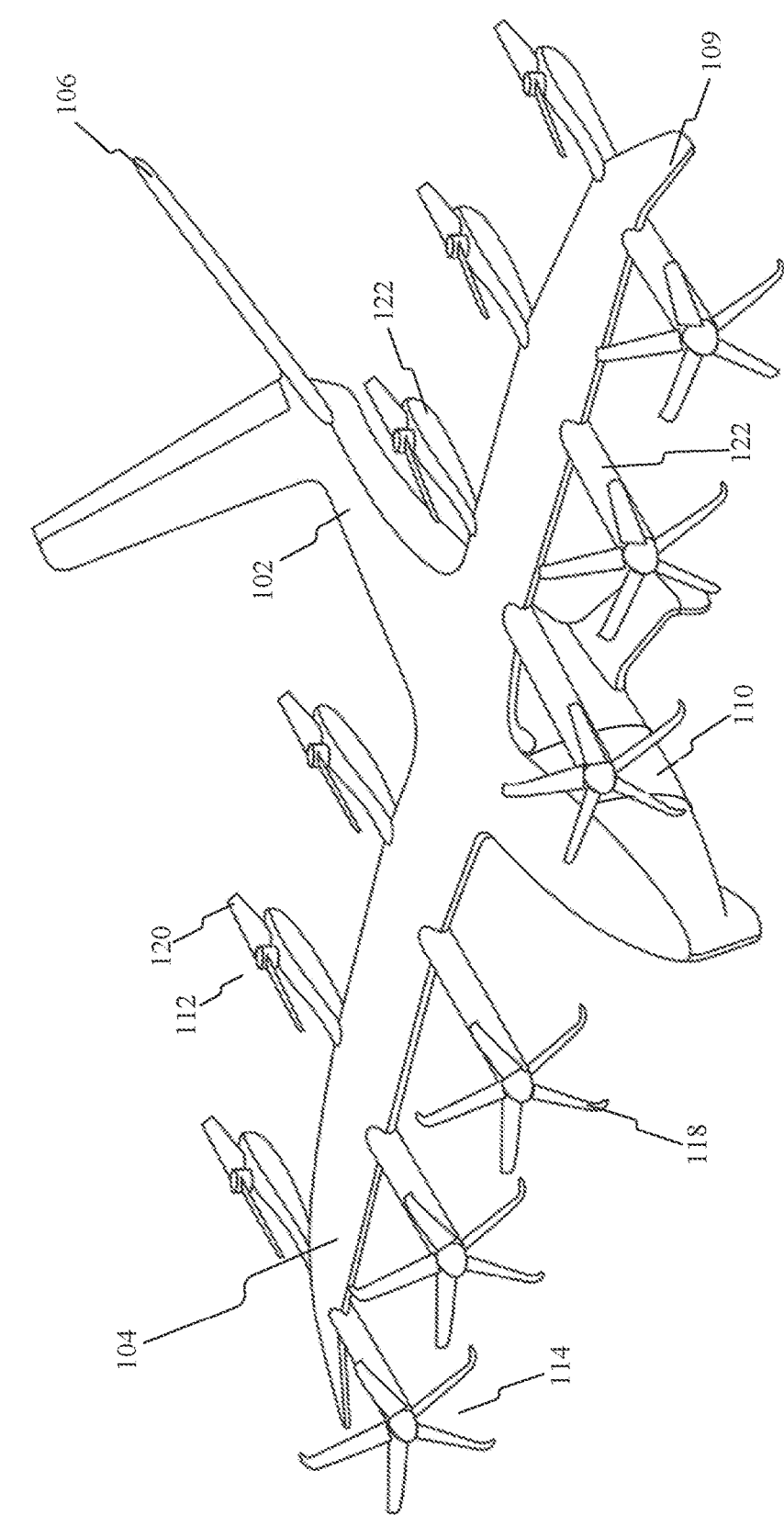

(51) Int. Cl.
    *B64D 27/24*       (2006.01)
    *B64D 27/40*       (2024.01)

(58) Field of Classification Search
    CPC ........ B64D 27/40; B64D 27/30; B64D 33/08;
                                            B64U 30/293
    See application file for complete search history.

(56)                      References Cited

U.S. PATENT DOCUMENTS

| | | | |
|---|---|---|---|
| 11,124,286 B1 * | 9/2021 | Piedmonte | B64U 10/20 |
| 11,465,737 B1 | 10/2022 | Mcdonald | |
| 11,548,621 B1 | 1/2023 | Robinson et al. | |
| 11,603,191 B1 * | 3/2023 | Foskey | B64C 29/0033 |
| 11,613,350 B1 | 3/2023 | Kumar et al. | |
| 2003/0094537 A1 * | 5/2003 | Austen-Brown | B64C 27/28 |
| | | | 244/7 R |
| 2018/0362154 A1 * | 12/2018 | Louis | B64U 10/20 |
| 2019/0031316 A1 * | 1/2019 | Hefner | B64C 11/48 |
| 2019/0135425 A1 | 5/2019 | Moore et al. | |
| 2019/0248481 A1 * | 8/2019 | Speller | B64C 29/0033 |
| 2019/0337613 A1 | 11/2019 | Villa et al. | |
| 2019/0337614 A1 | 11/2019 | Villa et al. | |
| 2021/0031910 A1 * | 2/2021 | Cornes | B64C 27/30 |
| 2022/0111956 A1 | 4/2022 | Jordan | |
| 2022/0161926 A1 * | 5/2022 | Duffy | B64C 27/30 |
| 2022/0234728 A1 | 7/2022 | Groninga et al. | |
| 2022/0250756 A1 * | 8/2022 | Wagner | B64D 27/31 |
| 2023/0056974 A1 * | 2/2023 | Foskey | B64C 29/0033 |

FOREIGN PATENT DOCUMENTS

| | | | | |
|---|---|---|---|---|
| EP | 3771637 A1 * | 2/2021 | | B64C 1/14 |
| WO | 2023063141 A1 | 4/2023 | | |

* cited by examiner

200

300

300

300

300

500

557

556

558

551

500

500

700

700

SYSTEMS AND METHODS FOR RETRACTING LIFT PROPELLER IN eVTOL AIRCRAFT

CROSS-REFERENCE TO RELATED APPLICATIONS

This application is a continuation of application Ser. No. 18/324,702, filed May 26, 2023 (now U.S. Pat. No. 11,827, 349), which is incorporated herein by reference in its entirety for all purposes.

TECHNICAL FIELD

This disclosure relates generally to the field of powered aerial vehicles. More particularly, and without limitation, the present disclosure relates to innovations in tilt-propeller aircraft that use electrical propulsion systems. Certain aspects of the present disclosure generally relate to retraction systems for lift propellers. Other aspects of the present disclosure generally relate to improvements in propellers that may be used in other types of vehicles but provide particular advantages in aerial vehicles.

SUMMARY

Some embodiments of the present disclosure provide a lift apparatus of a vertical takeoff and landing (VTOL) craft. The lift apparatus may comprise: a lift propeller; a motor assembly configured to rotate the lift propeller to generate a lifting force; and a boom coupled to the motor. The lift propeller may be configured to be displace vertically between a lift configuration and a stowed configuration, the lift propeller being displaced further from the boom in the lift configuration than in the stowed configuration.

Some embodiments of the present disclosure provide a method of operating a tilt apparatus of a vertical takeoff and landing (VTOL) craft. The method may comprise: displacing a lift propeller vertically between a lift configuration and a stowed configuration, the lift propeller being mounted to a boom and being displaced further from the boom in the lift configuration than in the stowed configuration.

BRIEF DESCRIPTIONS OF FIGURES

Figure 1B:
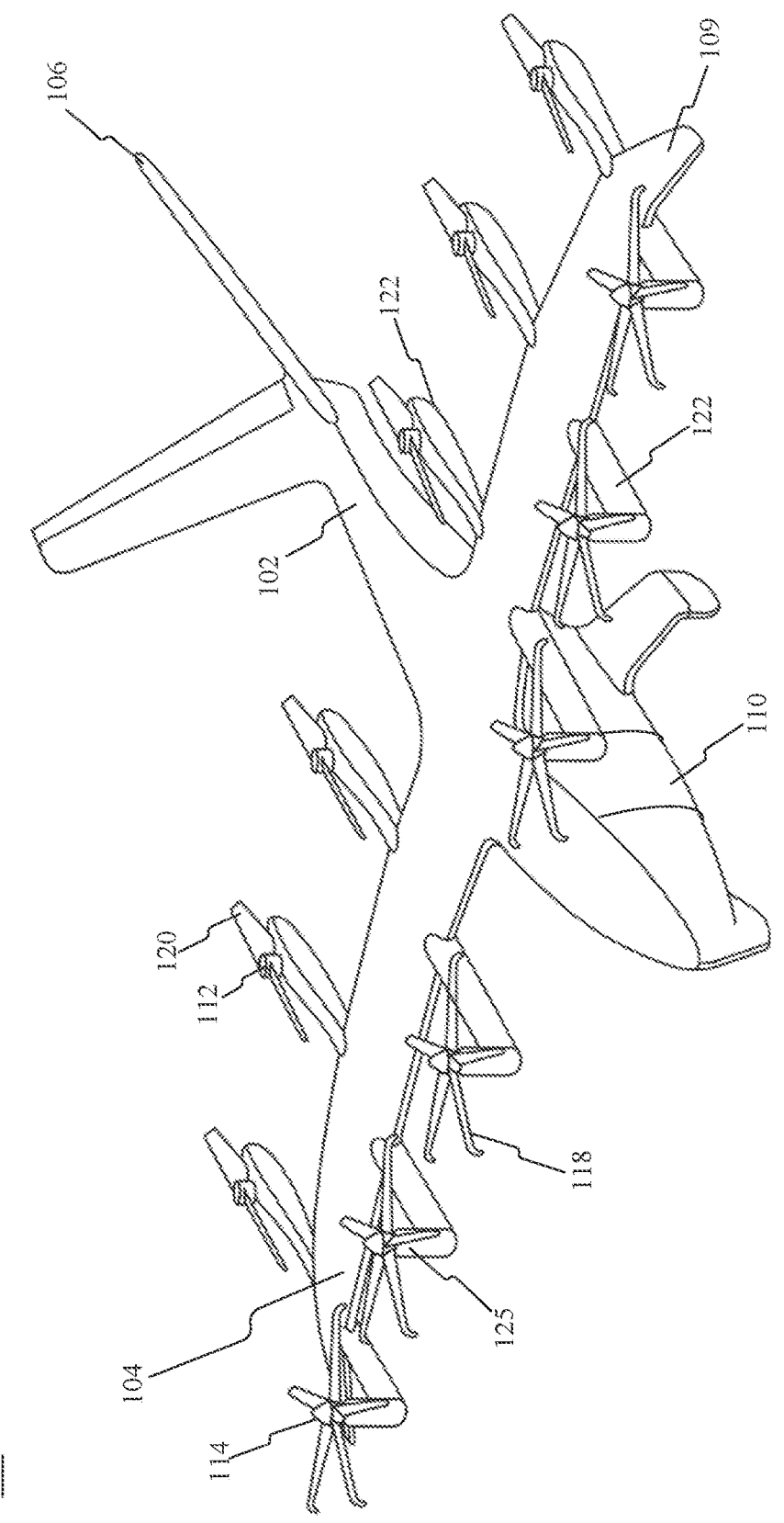

FIGS. 1A-B are schematic diagrams illustrating an exemplary VTOL aircraft, consistent with embodiments of the present disclosure.

Figure 2A:
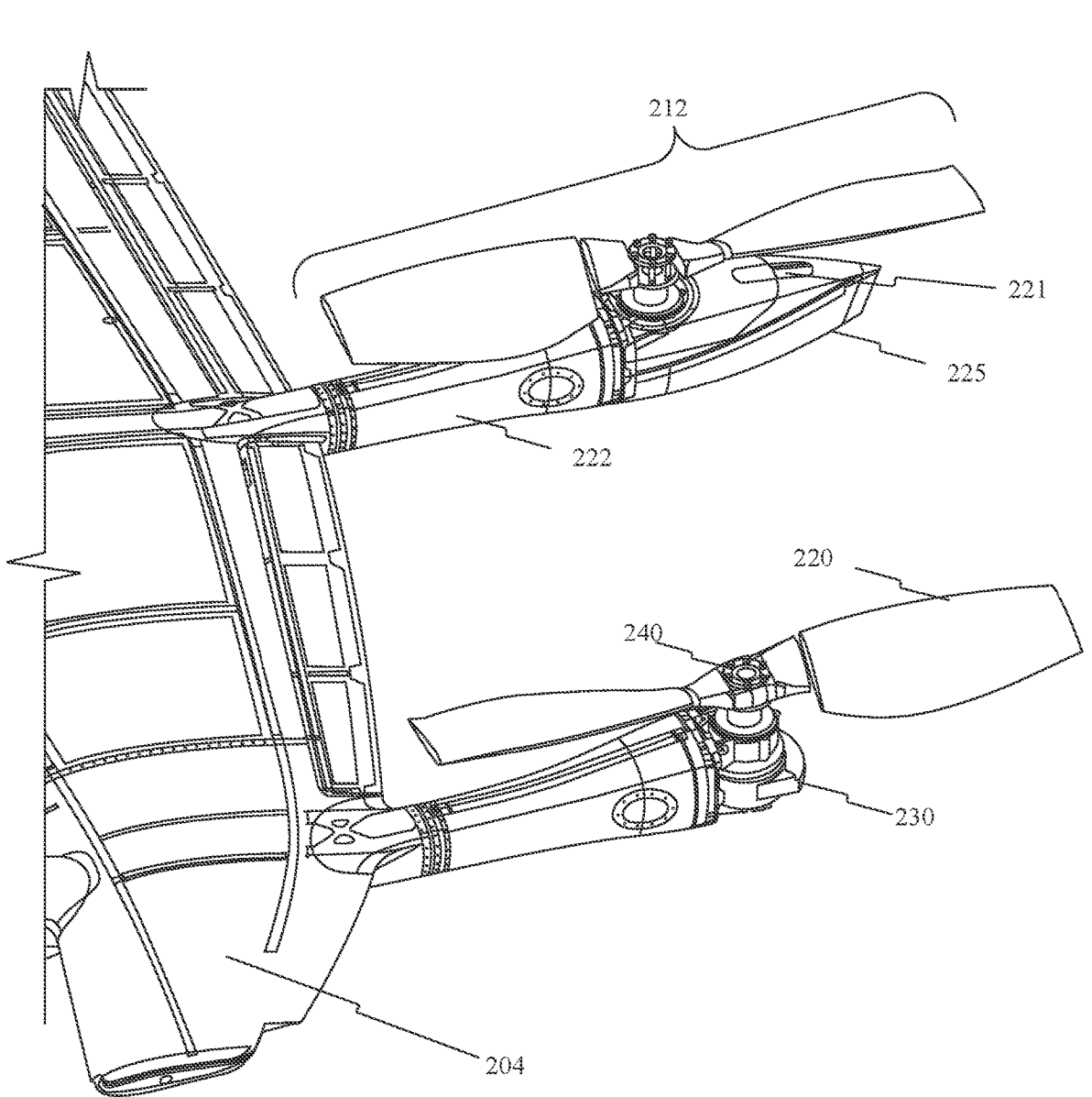
Figure 2B:
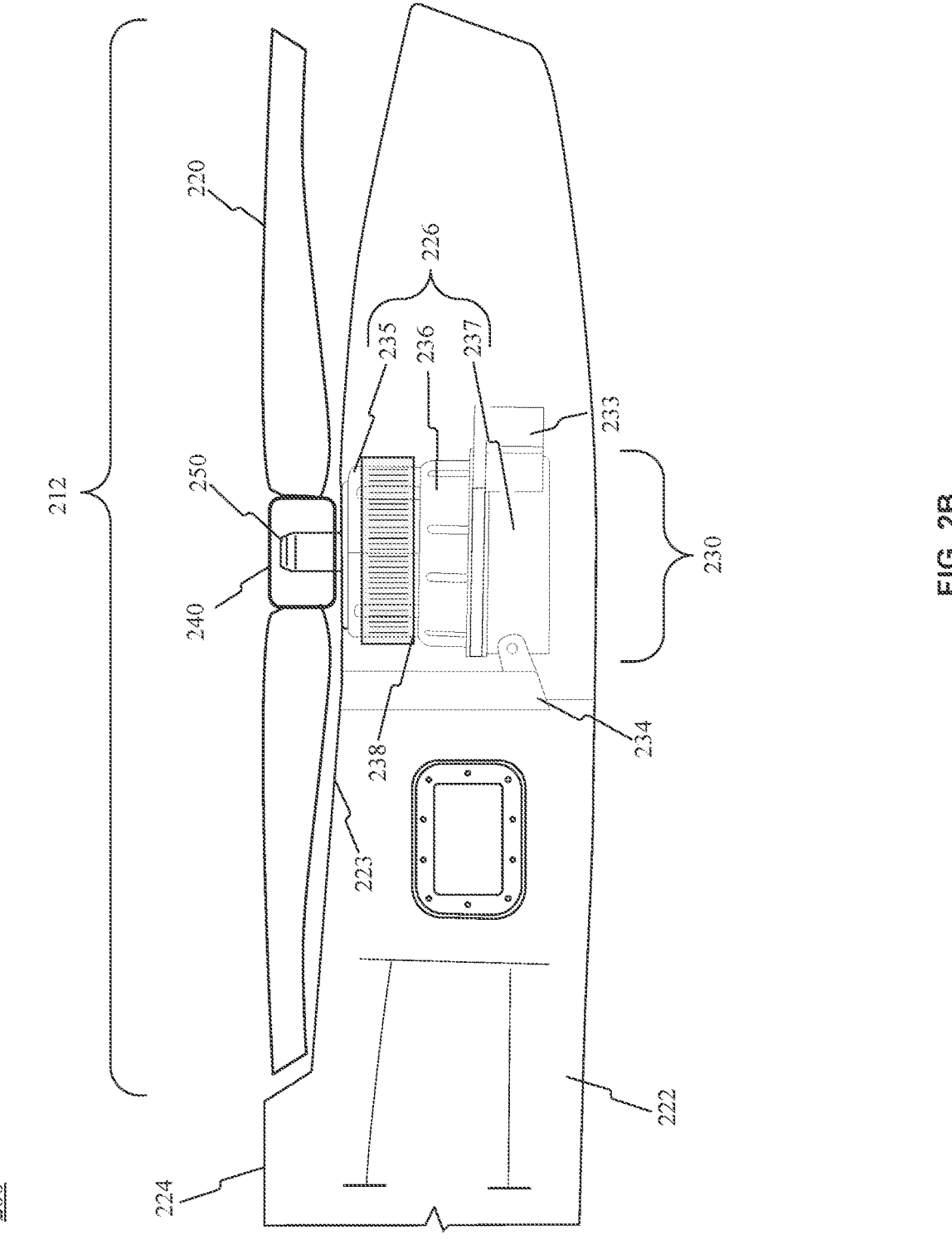

FIGS. 2A-B are schematic diagrams illustrating exemplary lift propellers in VTOL aircraft, consistent with embodiments of the present disclosure.

FIGS. 3A-H are schematic diagrams illustrating exemplary lift propeller retracting configurations in VTOL aircraft, consistent with embodiments of the present disclosure.

FIGS. 4A-E are schematic diagrams illustrating exemplary hub retraction systems for VTOL aircraft, consistent with embodiments of the present disclosure.

FIGS. 5A-E are schematic diagrams illustrating exemplary motor shaft pass-through systems for VTOL aircraft, consistent with embodiments of the present disclosure.

Figure 6A:
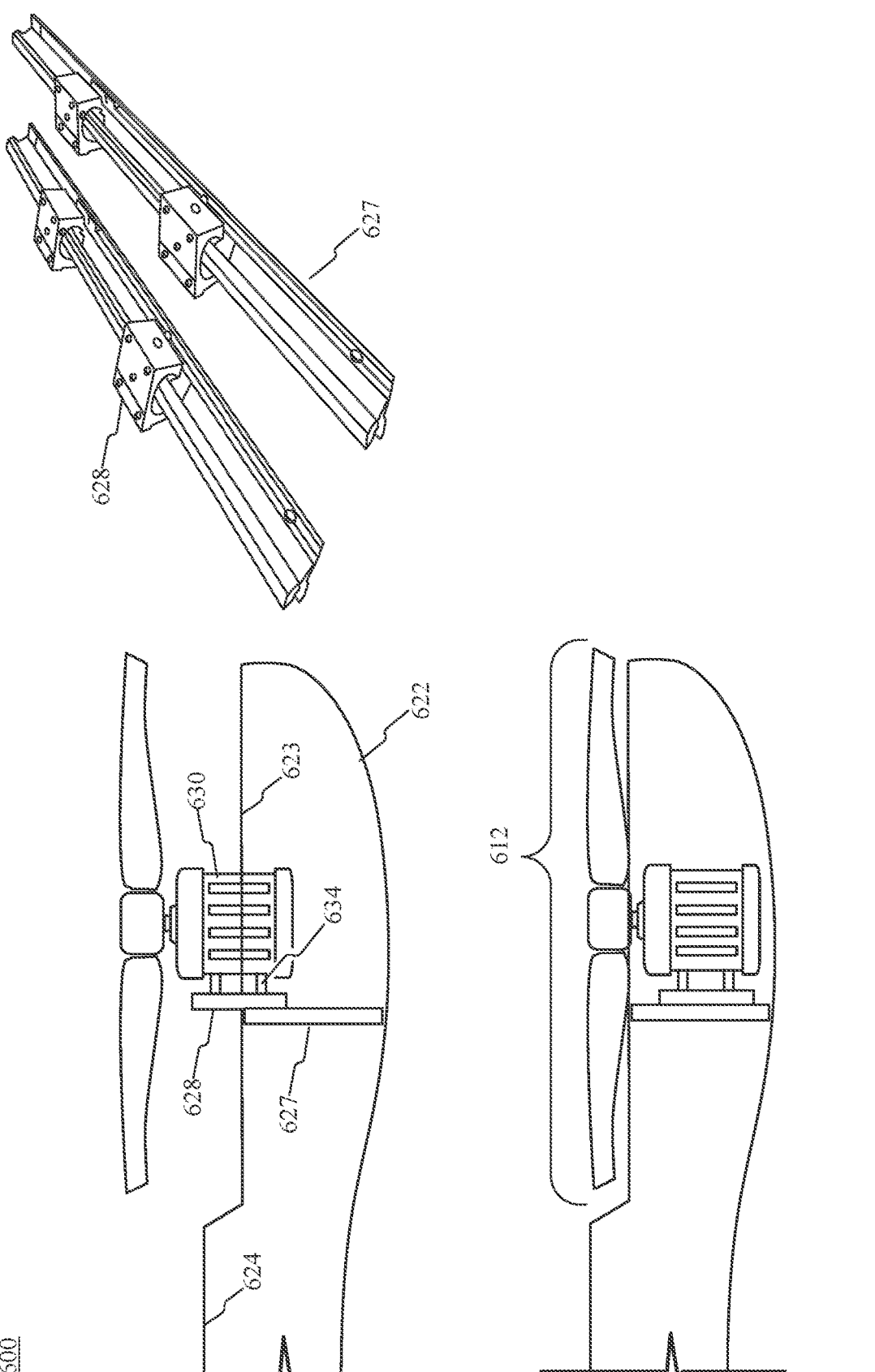
Figure 6B:
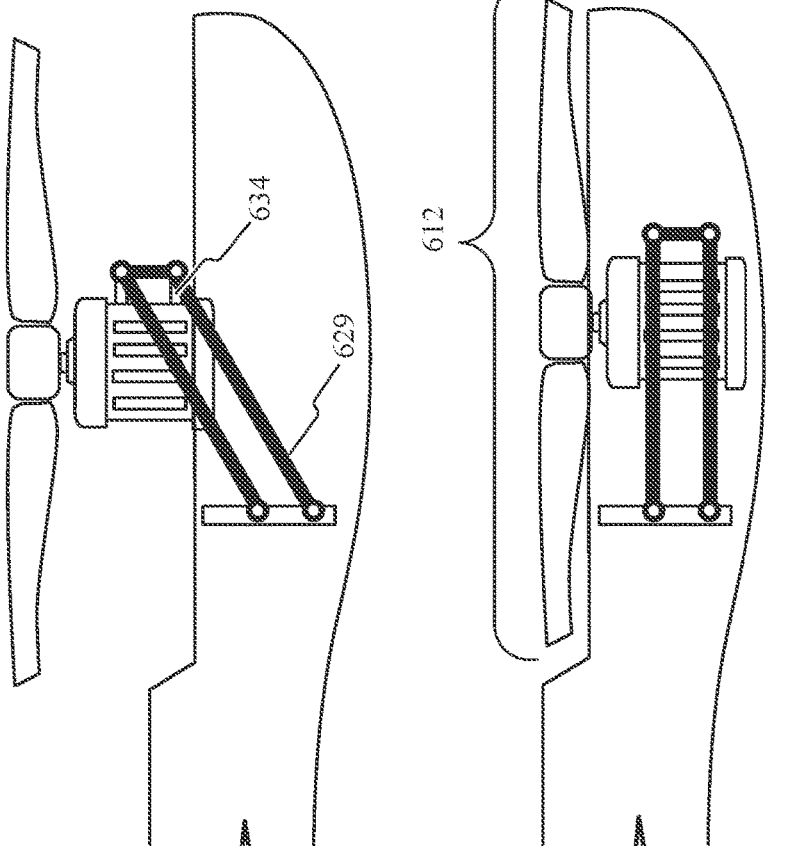
Figure 6C:
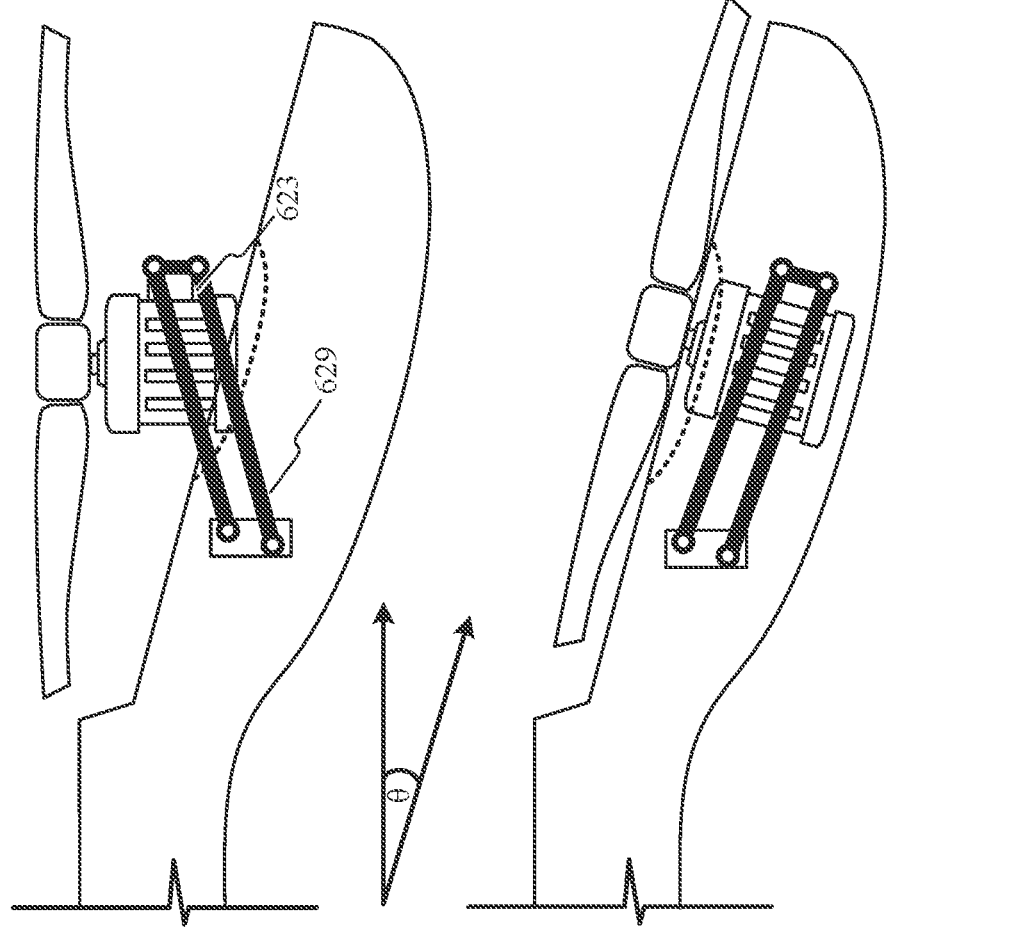

FIGS. 6A-C are schematic diagrams illustrating exemplary rail and linkage systems for VTOL aircraft, consistent with embodiments of the present disclosure.

FIGS. 7A-G are schematic diagrams illustrating exemplary cooling systems for VTOL aircraft, consistent with embodiments of the present disclosure.

DETAILED DESCRIPTION

The present disclosure addresses components of electric vertical takeoff and landing (eVTOL) aircraft primarily for use in a non-conventional aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, the Federal Aviation Administration enforces federal laws and regulations requiring safety components such as fire protective barriers adjacent to engines that use more than a threshold amount of oil or other flammable materials.

In preferred embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent. In some embodiments, an aircraft may possess four forward and four aft propellers, where at least four of these propellers comprise tiltable propellers.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electric engine may be housed or connected to a boom of an aircraft and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger. In some embodiments, the amount of oil used to lubricate and cool the electric engine may vary, including amounts less than one quart, two quarts, three quarts, or any other measured amount of oil.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from the Flight Control System (FCS) over a digital communication interface to each electric engine. Embodiments may include forward electric engines, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, an aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during take-off and landing. During the flight phases where the aircraft is in forward flight-mode, the forward propulsion systems may provide horizontal thrust, while the aft propulsion system propellers may be stowed at a fixed position in order to minimize drag. The aft electric propulsion systems may be actively stowed with position monitoring. Some embodiments may include a transition from vertical flight to horizontal flight and vice-versa. In some embodiments, the transitions may be accomplished via the tilt propeller system (TPS). The TPS redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

In some embodiments, an electrical engine as described herein may possess design features which mitigate and protect against uncontained fire, such as utilizing less than one quart, or another non-hazardous quantity, of flammable fluid contained in both the tilt and lift engines, not possessing a nominal ignition source within the electric engines, possessing an engine over temperature operating limit that may be more than 50° C. less than a flammable fluid auto-ignition temperature, overtemperature detection and protection, overvoltage detection and protection, and overcurrent detection and protection. In some embodiments, the design features of the electrical engine may deem it to not be a designated fire zone.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, coolant liquid, or a mixture of both.

For example, a configuration of an electrical engine may include a motor and inverter wherein the motor is in between the propeller of the aircraft and the inverter. Additionally, a motor may include a gearbox. Further, an inverter may share the same central axis as a motor wherein the inverter may be located in a housing that is cantilevered off of the rear of the motor and may be air cooled. It is recognized that such an inverter orientation would not be an optimum configuration in terms of the housing required to achieve such a cantilevered orientation. Additionally, a motor in this configuration utilizing air cooling may comprise potting material and air fins to assist with cooling of the motor may lead to an even larger increase in mass of the system.

Some embodiments may include an electrical engine, wherein inverter modules may be mounted on the outside of a motor housing. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator housing, a wound stator assembly, a rotor, various bearings, and any additional components such that to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. It should be understood that the example embodiments as mentioned herein are representative and do not dictate the bounds of the amount of lubricant and coolant that may be used in an electrical engine.

It is understood that by using oil to not only lubricate the electrical engine but also cool the electrical engine rather than another coolant, additional oil will be added to the system, but that oil will remove traditional components that may be used to cool such an electrical engine. For example, if the electrical engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Additional embodiments of electrical engines may possess various components to ensure any flammable fluids are monitored and prevented from entering certain sections of the electrical engine. Some embodiments may include an electric engine possessing a wet zone enclosure that may be defined by a gearbox, motor, and/or heat exchanger. In some embodiments, an electric engine may possess up to 4 liters of air within the motor-gearbox housing which is in contact with engine oil. Embodiments of a motor-gearbox housing may equalize internal and external pressure using a breather. Embodiments of a breather may include it protruding above nearby design features in order to prevent inadvertent entry of external fluids. Additional embodiments may include a breather that possesses a screen and a circuitous entry path to prevent entry of external debris. Embodiments may include a sight glass being present on both the tilt and lift electric engines in order to check that oil is not overfilled or underfilled during servicing.

Additional embodiments of electrical engines may include active protection features in the forward and aft electrical engines such as monitoring internal temperatures throughout the engine operation, including oil temperature, stator winding sets, inverter bulk capacitors, power modules, control board power modules, control board control processors, control board monitor processors, internal hot-spots, and other various locations throughout the engine. Embodiments may include overtemperature limits that take into account known failure temperatures and operating limits in relation to auto-ignition temperatures of fluids. Some embodiments may include a High Voltage Power System that may have fuses at the high voltage battery terminals which may rapidly disconnect the engine electrical connection irreversibly to mitigate overcurrent events. This overcurrent protection may be activated when the electric engine current draw is greater than the overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter will detect AC overcurrent and isolate the erroneous phase and/or will continuously monitor input DC voltage, and will apply protective actions to keep voltages under the overvoltage operating limit.

Propellers and other aerodynamic surfaces of the VTOL aircraft may generate drag resistance during flight. Drag may generally be a much greater concern during transition and cruise flight than it is during takeoff, landing, or hover. In particular, lift propeller systems represent an unwanted source of drag penalties when they are in a stowed position during cruise. For example, excrescence drag may be generated by airflow passing through a space between the blades of a lift propeller and the boom, or other structure, to which it is mounted, as well as by airflow passing around a shaft coupled to the propeller. Excrescence may be an especially problematic drag component in light aircraft such as eVTOL.

It may not be feasible to minimize drag solely by reducing a size, or altering a shape, of lift propeller surfaces. For example, propeller blades must have a sufficient size, shape and angle to generate lift during takeoff, landing and hover. Further, reducing a diameter of the shaft may undesirably impact its torsional stiffness, increasing the chance of failure and reducing the lifetime of lift apparatus components.

Additionally, when a lift propeller is in use, the blades should ideally be spaced away from the boom to avoid the production of damaging and unpleasant vibrations in, e.g., a boom, wing or other component of the aircraft. Yet during cruise, it may be desirable to stow the lift propellers as close to the boom as possible to minimize drag. Thus, there are competing factors governing a preferred gap distance between a lift propeller and boom, and the preferred gap distance may vary depending on the phase of flight.

In view of the above considerations, it may be desirable to stow a lift propeller in a manner that minimizes drag during cruise, yet allows a sufficient separation between the propeller blades and boom in a lift configuration, such as during takeoff, landing and hover.

Embodiments of the present disclosure provide a lift propeller system that may generate a low-vibration lifting force in a lift configuration and generate low drag resistance when stowed in a cruise configuration. The lift propeller may be coupled to a lift motor that is mounted to, e.g., a boom or other structure. When in use, the lift propeller may be actuated vertically into the lift configuration so that the propeller blades are elevated a sufficient distance above the boom to avoid vibration and noise, and to generate unobstructed downward airflow. When stowed for cruise, the lift propeller may be lowered again to a position in which the blades sit close to the boom for minimal drag resistance. In some embodiments, the blades may be retracted behind a raised surface of the boom or another component so that airflow under the blades may be greatly reduced.

In some embodiments, designing a lift propeller that can be actuated between these two configurations may introduce additional design considerations. For example, it may be critical in eVTOL design to configure systems such that they are as light and fail-safe as possible. Therefore, it may be desirable to configure systems with a simple and robust design, for example by eliminating heavy actuators, power sources, control components and articulated doors, covers or other moving parts. Such simplifications serve the dual purpose of reducing weight and eliminating failure points. Further, it may be desirable to configure any moving parts such that they do not risk collision with other components of the craft, either during normal operation or in the event of a failure. These design considerations may be important as a matter of general safety. Further, in an emerging technological field where regulations are uncertain, maximizing safety may ensure a high probability of regulatory approval or compliance.

Therefore, some embodiments of the present disclosure may provide a passive lift propeller actuation system that is lightweight, fail-safe, and requires little or no dedicated power or control components. Propeller blades according to embodiments of the present disclosure may be capable of spinning freely, even when fully retracted, without risking any collision with other components. The propellers may be pulled into or out of a lift configuration simply by operation of the blades themselves, optionally in concert with a passive retraction device such as a spring.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

As used herein, the term "tilt propeller" refers to a variable pitch propeller configured to provide thrust for vertical lift and forward propulsion by varying the plane of rotation and pitch of the propeller. The term "lift propeller" may refer to a fixed-pitch propeller configured to provide thrust for vertical lift. In some embodiments, the pitch of lift propeller may be variable.

FIGS. 1A-B illustrate a VTOL aircraft 100 in a cruise configuration and a vertical take-off, landing and hover configuration (also referred to herein as a "lift" configuration), respectively, consistent with embodiments of the present disclosure. The aircraft 100 may include a fuselage 102, wings 104 mounted to the fuselage 102, and one or more rear stabilizers 106 mounted to the rear of the fuselage 102. A plurality of lift propellers 112 may be mounted to wings 104 and configured to provide lift for vertical take-off, landing and hover. A plurality of tilt propellers 114 may be mounted to wings 104 and may be tiltable between the cruise configuration in which they provide forward thrust to aircraft 100 for horizontal flight, as shown in FIG. 1A, and the lift configuration in which they provide a portion of the lift required for vertical take-off, landing and hovering, as shown in FIG. 1B. As used herein, a lift configuration may refer to a tilt propeller orientation in which the tilt propeller thrust is providing primarily lift to the aircraft. A cruise configuration may refer to a tilt propeller orientation in which the tilt propeller thrust is providing primarily forward thrust to the aircraft. Alternatively, a cruise configuration may refer to a configuration in which a lift propeller is stowed.

In some embodiments, lift propellers 112 may be configured for providing lift only, with all propulsion being provided by the tilt propellers. Accordingly, lift propellers 112 may be in fixed positions and may only generate thrust during take-off, landing and hover. Meanwhile, tilt propellers 114 may be tilted to lift configurations in which their thrust is directed downwardly for providing additional lift.

For forward flight, tilt propellers 114 may tilt from their lift configurations to their cruise configurations. In other words, the pitch and tilt angle of tilt propellers 114 may be varied from an orientation in which the tilt propeller thrust is directed downward (to provide lift during vertical take-off, landing and hover) to an orientation in which the tilt propeller thrust is directed rearward (to provide forward thrust to aircraft 100). The tilt propellers may tilt about axes that may be perpendicular to the forward direction of the aircraft 100. When the aircraft 100 is in full forward flight during the cruise configuration, lift may be provided entirely by wings 104. Meanwhile, lift propellers 112 may be shut off. The blades 120 of lift propellers 112 may be locked in low-drag positions for aircraft cruising. In some embodiments, lift propellers 112 may each have two blades 120 that may be locked for cruising in minimum drag positions in which one blade is directly in front of the other blade as illustrated in FIG. 1A. In some embodiments, lift propellers 112 have more than two blades. In some embodiments, tilt propellers 114 include more blades 118 than lift propellers 112. For example, as illustrated in FIGS. 1A-B, lift propellers 112 may each include, e.g., two blades and tilt propellers 114 may each include, e.g., five blades. In some embodiments, tilt propellers 114 may have, e.g., from 2 to 5 blades.

In some embodiments, the aircraft may include only one wing 104 on each side of fuselage 102 (or a single wing that extends across the entire aircraft) and at least a portion of lift propellers 112 may be located rearward of wings 104 and at least a portion of tilt propellers 114 may be located forward of wings 104. In some embodiments, all of lift propellers 112 may be located rearward of wings 104 and all of tilt propellers 114 may be located forward of wings 104. According to some embodiments, all lift propellers 112 and tilt propellers 114 may be mounted to the wings—i.e., no lift propellers or tilt propellers may be mounted to the fuselage. In some embodiments, lift propellers 112 may be all located rearwardly of wings 104 and tilt propellers 114 may be all located forward of wings 104. According to some embodiments, all lift propellers 112 and tilt propellers 114 may be positioned inwardly of the wing tips 109.

In some embodiments, lift propellers 112 and tilt propellers 114 may be mounted to wings 104 by booms 122. Booms 122 may be mounted beneath wings 104, on top of the wings, and/or may be integrated into the wing profile. In some embodiments, one lift propeller 112 and one tilt propeller 114 may be mounted to each boom 122. Lift propeller 112 may be mounted at a rear end of boom 122 and tilt propeller 114 may be mounted at a front end of boom 122. In some embodiments, lift propeller 112 may be mounted in a fixed position on boom 122. In some embodiments, tilt propeller 114 may mounted to a front end of boom 122 via a hinge. Tilt propeller 114 may be mounted to boom 122 such that tilt propeller 114 is aligned with the body of boom 122 when in the cruise configuration, forming a continuous extension of the front end of boom 122 that minimizes drag for forward flight.

In some embodiments, aircraft 100 may include, e.g., one wing on each side of fuselage 102 or a single wing that extends across the aircraft. According to some embodiments, the at least one wing 104 is a high wing mounted to an upper side of fuselage 102. According to some embodiments, the wings include control surfaces, such as flaps, ailerons or flaperons. According to some embodiments, the wings may have curved wing tips 109 for reduced drag during forward flight.

In some embodiments, rear stabilizers 106 include control surfaces, such as one or more rudders, one or more elevators, and/or one or more combined rudder-elevators. The wing(s) may have any suitable design. For example, the wings have a tapering leading edge or a tapering trailing edge. In some embodiments, the wings may have a substantially straight leading edge in the central section of wings 104.

Aircraft 100 may include at least one door 110 for passenger entry and exit. In some embodiments, the door 110 may be located beneath and forward of wings 104 as seen in FIGS. 1A-B.

In some embodiments, lift propellers 112 or tilt propellers 114 may canted relative to at least one other lift propeller 112 or tilt propeller 114. As used herein, canting refers to a relative orientation of the rotational axis of the lift propeller/tilt propeller about a line that is parallel to the forward-rearward direction, analogous to the roll degree of freedom of the aircraft. Canting of the lift propellers and/or tilt propellers may help minimize damage from propeller burst by orienting a rotational plane of the lift propeller/tilt propeller discs (the blades plus the propeller portion onto which the blades are mounted) so as to not intersect critical portions of the aircraft (such areas of the fuselage in which people may be positioned, critical flight control systems, batteries, adjacent propellers, etc.) or other propeller discs and may provide enhanced yaw control during flight.

Lift propellers 112 may be canted in any suitable manner and combination. For example, lift propellers 112 may be canted away from fuselage 102, such that lift propellers on a first side of the fuselage are canted in a first direction, and lift propellers on a second side of the fuselage are canted in a second direction. In some embodiments, lift propellers 112 may be canted according to a corresponding tilt propeller. Any suitable combination of canting and/or non-canting of the lift propellers relative to one another and relative to the tilt propellers can be used to achieve desired performance characteristics.

Further discussion of VTOL aircraft may be found in U.S. Patent Publication No. 2021/0362849, which is incorporated by reference in its entirety.

As discussed above, motors and related control components of VTOL aircraft may generate heat during operation. The heat must be dissipated to prevent degradation or damage to the motor, control components and other elements of the VTOL aircraft. For example, cooling may be achieved by directing an air flow over a heated component. The heated component may be, e.g., a motor or other heat-generating component, or it may be, e.g., a heat exchanger configured to receive heat from a heat-generating component by way of a liquid heat exchange medium. However, it may be difficult to achieve a sufficient airflow to cool the tilt motors in the lift configuration for the reasons discussed above. Therefore, it may be desirable to provide a tilt motor cooling system capable of producing sufficient airflow even when the VTOL aircraft is operating in the lift configuration.

FIGS. 2A-B illustrate portions of a VTOL aircraft 200, consistent with embodiments of the present disclosure. VTOL aircraft 200 may be, e.g., similar to VTOL aircraft 100 of FIGS. 1A-B. Elements in FIGS. 2A-B that are similar to those in FIGS. 1A-B may be labeled with corresponding numbers using 2 as the leading digit. For example, in some embodiments, lift propeller blades 220 of FIGS. 2A-B may be similar to lift propeller blades 120 of FIGS. 1A-B.

In FIG. 2A, two booms 222 are depicted on wing 204, the lower boom being shown in exploded view with a motor assembly 230 exposed. The upper boom 222 is shown as it would be seen in operation, with a fairing 225 covering its motor assembly. Motor assembly 230 may be coupled to boom 222 by a mount 234 (as seen in FIG. 2B). Each motor assembly 230 may be configured to drive its lift propeller 212 comprising blades 220 affixed to a hub 240.

Boom 222 may be a structural component, in that it may significantly contribute to the structural integrity of VTOL aircraft 200 and provide structural support to motor assembly 230 and lift propeller 212. Stated another way, boom 222 may an elongated support structure for motor assembly 230, lift propeller 212, fairing 225, or other components of the VTOL aircraft 200. Fairing 225 may be an aerodynamic component. For example, fairing 225 may be shaped to provide aerodynamic advantages, such as reduced drag, but may not significantly contribute to the structural integrity of VTOL aircraft 200 or provide structural support to motor assembly 230 or lift propeller 212. In some embodiments, the element labeled 225 may instead comprise a structural portion of the boom 222.

Fairing 225 or boom 222 may further be configured to channel cooling air to motor assembly 230. For example, fairing 225 may comprise one or more air inlets or other openings 221 in its top side. Air inlet 221 may be an aperture positioned at an advantageous region on fairing 225 or boom 222 so as to receive a large of amount of cooling air from a downwash (i.e., a flow of air being forced down by the rotation of blades 220) from lift propeller 212 during operation. Such configurations are further discussed below with respect to FIGS. 7A-I, as well as in U.S. Pat. No. 11,613, 350, which is incorporated by reference in its entirety. In some embodiments, opening 221 may be configured to allow components of motor assembly 230 or lift propeller 212 to move between lift and stowed configurations, alternatively or in addition to serving as an inlet for cooling air.

FIG. 2B illustrates an example closeup view of a boom 222 and motor assembly 230 of FIG. 2A when stowed in a cruise configuration, consistent with embodiments of the present disclosure. Motor assembly 230 may be mounted to, and supported by, boom 222 via mount 234. Motor assembly 230 may further be coupled to a hub 240 of a lift propeller via shaft 250. Motor assembly 230 may be configured to rotate the shaft 250 at variable speeds to generate vertical thrust at lift propeller 212 in a lift configuration during a lift phase of VTOL aircraft 200. Motor assembly 230 may be configured to position blades 220 of in a fixed low-drag cruise configuration during a cruise phase of VTOL aircraft 200, such as by orienting the blades 220 parallel to the direction of flight.

Motor assembly 230 may comprise, e.g., a motor 235, gearbox 236, and inverter 237. Motor assembly 230 may further comprise an enclosure 226 around motor 235, gearbox 236, and inverter 237. For example, enclosure 226 may comprise a substantially form-fitting casing around the components 235-237 of motor assembly 230. Because motor 235, gearbox 236, and inverter 237 are encased within enclosure 226, the inner workings of said components are not displayed here. Enclosure 226 may prevent dust, debris or other pollutants contained in a cooling airflow from negatively impacting the components 235-237. In some embodiments, motor assembly 230 may be moved to an exposed position outside of boom 222 in the lift configuration. Therefore, enclosure 226 may further be configured to protect motor assembly 230 from debris and other fast-moving airborne objects. For example, at least an exposed portion of enclosure 226 may be formed of a durable material having a thickness sufficient to protect against small projectiles moving at a predetermined relative speed. In this way, motor assembly 230 may be protected, e.g., when transitioning to or from the stowed configuration. At the same time, a material of enclosure 226 may be selected to have a high thermal conductivity to facilitate cooling of motor assembly 230.

Motor assembly 230 may further comprise heat transfer elements 233 and 238 placed outside the enclosure 226 to thermally couple the components 235-237 of motor assembly 230 to, e.g., a cooling airflow. Heat transfer elements 233 and 238 may be, e.g., cooling fins or a heat exchanger configured to receive a circulating heat exchange medium. For example, heat transfer element 238 may comprise cooling fins coupled to enclosure 226 to surround motor 235 at an upper portion of motor assembly 230. Further, heat transfer element 233 may comprise a heat exchanger coupled to enclosure 226 near inverter 237 at a lower portion of motor assembly 230. In some embodiments, the heat exchange medium may comprise oil, and the oil may be used to both lubricate and cool the components of motor assembly 230. In some embodiments, either of heat transfer elements 233 or 238 may comprise cooling fins, a heat exchanger, or another heat transfer device.

It should be understood that the spatial relationships among the different motor components shown in FIG. 2B are given by way of example, and need not always be arranged in this way. For example, in some embodiments, gearbox 236 may not be located below motor 235, or neither component may necessarily be located above or below the other. In general, the various components of motor assembly 230 may be arranged in a plurality of configurations as would be understood by those of ordinary skill in the art. Furthermore, motor assembly 230 may comprise additional components, or may omit one or more components discussed herein. There may be more or fewer heat transfer elements than are shown in FIG. 2B, and their sizes, shapes, locations and operational characteristics may vary. Further aspects of motor assembly 230 and heat transfer elements 233 and 238 are discussed in the above-incorporated U.S. Pat. No. 11,613,350.

Boom 222 may further comprise a boom surface 223 located under hub 240 or blades 220. During cruise, blades 220 and hub 250 may be desirably located close to boom surface 223 to minimize drag associated with airflow passing between the boom surface 223 and blades 220 or hub 240, or passing around shaft 250. In some embodiments, a shield surface 224 may be provided on boom 222 or another component of VTOL aircraft 200, such as a wing 204. Shield surface 224 may be a surface configured to further reduce drag by blocking or diverting the airflow away from a path under blades 220. Shield surface may be raised relative to, e.g., boom surface 223 or blades 220, or may otherwise cover portions of propeller 212 in the direction of cruise flight. Shield surface 224 may be, e.g., an aerodynamic fairing, a substantially aft-facing scoop (see e.g., FIG. 3C) or simply a contour of VTOL aircraft body that is designed to redirect airflow over the retracted propeller blades. Thus, in some embodiments, boom surface 223 may be recessed from shield surface 224, and may therefore be optionally referred to as a recessed surface 223. By keeping propeller 212 close to boom surface 223, and optionally by including a shield surface 224, drag may be reduced during cruise, allowing for greater energy efficiency, speed and range of flight.

When switching to a lift configuration, it may be desirable to provide a larger gap distance between blades 220 and boom surface 223 by moving propeller 212 upward relative to boom surface 223. As discussed above, this added gap distance may reduce the amount of noise and vibration induced in boom 222 by the operation of propeller 212, and it may increase a lifting force by allowing greater downward airflow. Embodiments of the present disclosure provide various configurations for moving the lift propellers to switch between lift and stowed configurations.

Although a close proximity between propeller 212 and boom 222 may be desired in the stowed configuration, some embodiments may nevertheless provide a minimum allowable distance between them. In some embodiments, for example, a minimum gap distance may be maintained so that blades 220 will not collide with boom 222 (or other components of VTOL aircraft 200), even if the blades are spinning at maximum speed in a fully retracted position. This may provide a fail-safe configuration in which lift propellers 212 are able to maintain safe flight characteristics even when their mechanisms for vertical movement are not functioning properly. In some embodiments, this may also allow for fully passive movement of lift propellers 212 between the lift and stowed configurations. For example, when the blades 220 can spin freely in the stowed configuration, they may be moved upward out of a stowed position by their own lifting force without any added power, control architecture, or assistance from dedicated actuators. Such an arrangement may not be possible if, e.g., a lift propeller is retracted inside a boom, surrounded by retracting covers, or otherwise obstructed when stowed.

Some embodiments may comprise an initiating mechanism to assist in displacing lift propeller 212 from boom 222 as the propeller begins initially rotating. For example, complimentary ramp faces (not shown) may be provided on fixed and rotating portions of VTOL aircraft 200 to urge lift propeller 200 upward during initial rotation. In some embodiments, a stationary ramp face may be provided, e.g., at an upper surface of motor assembly 230, while a moving complimentary ramp face may be affixed to a rotating portion such as hub 240 or shaft 250. In the stowed configuration, the complimentary ramp faces may be fully engaged. When rotation begins, the rotating ramp face may slide along the stationary ramp face to quickly move lift propeller 212 away from boom 222. When returning from the lift configuration to the stowed configuration, the two ramp faces may be re-engaged by active actuators or they may be returned passively by halting the propeller rotation and allowing the ramp surfaces to reengage.

It should further be understood that the illustrated lift propellers are depicted as being on an upper side of boom 222, but embodiments of the present disclosure are not limited to this. For example, in some embodiments a lift propeller may be located at an underside of boom 222, such that vertical actuation away from the boom is in the downward direction.

It should further be understood that the illustrated lift propellers are depicted as having two blades 220, but embodiments of the present disclosure are not limited to this. In some embodiments a lift propeller 212 may comprise, e.g., one, three, four, five, six, or any suitable number of blades 220. The blades may be coupled to a single hub 240. Alternatively, lift propeller 212 may comprise a series of stacked hubs 240. In such a case, each of the stacked hubs may be translated vertically when switching between the lift and stowed configurations. Stated another way, to ensure proper spacing from boom 222, the entire lift propeller 212 comprising all hubs 240 and blades 220 may move vertically away from the boom when moving from the stowed to the lift configuration.

A. Example Embodiments for Raising and Lowering a Lift Propeller

FIGS. 3A-H illustrate portions of a VTOL aircraft 300, consistent with embodiments of the present disclosure. VTOL aircraft 300 may be, e.g., similar to VTOL aircraft 100-200 of FIGS. 1A-2B. Elements in FIGS. 3A-H that are similar to those in FIGS. 1A-2B may be labeled with corresponding numbers using 3 as the leading digit. For example, in some embodiments, boom surface 323 of FIGS. 3A-H may correspond to boom surface 223 of FIG. 2B.

Figure 3A:
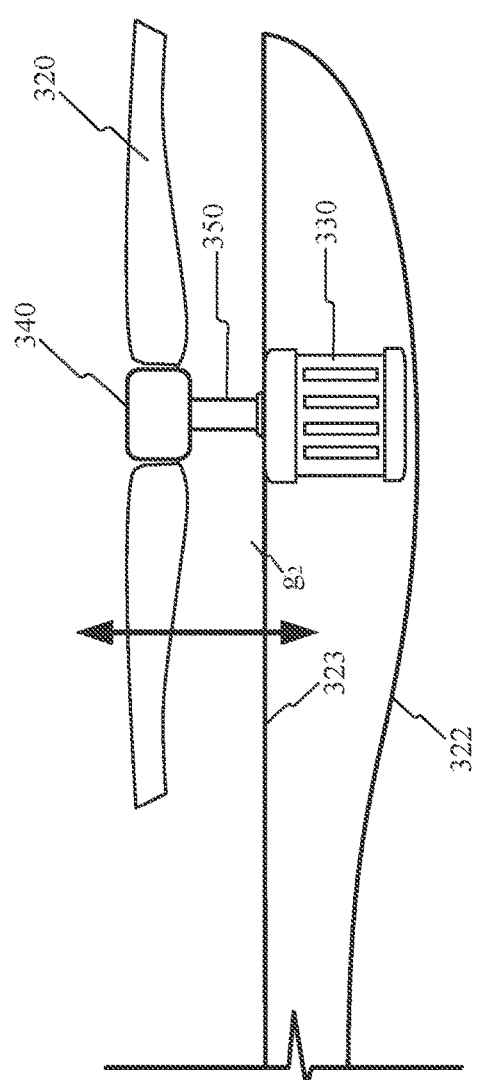
Figure 3A:
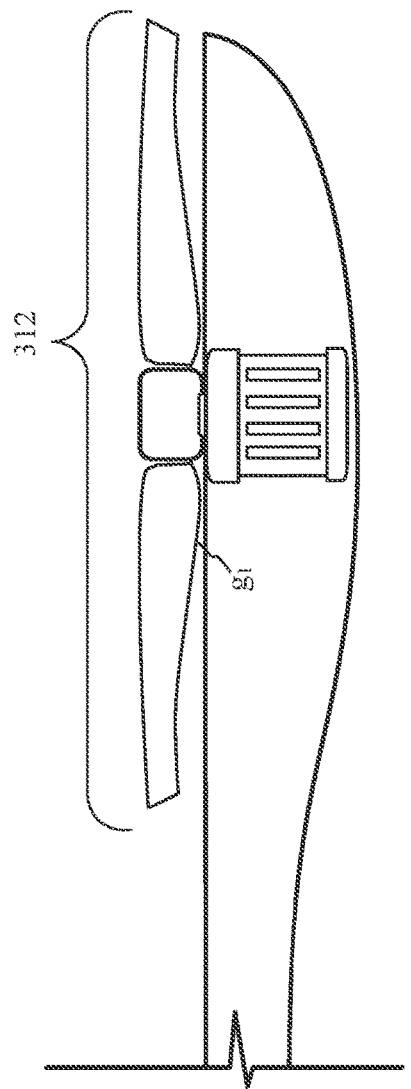

FIG. 3A illustrates an embodiment of lift propeller 312 in a lift configuration (at top) and a stowed configuration (at bottom), consistent with embodiments of the present disclosure. The illustrated embodiment of FIG. 3A may not include a shield surface configured to block or divert airflow in front of lift propeller 312. This may be beneficial in terms of, e.g., reducing the overall size of boom 322 or providing a more streamlined contour of boom 322. Instead, drag may be reduced simply in view of a reduced gap distance g between propeller 312 and boom surface 323 in the stowed configuration.

For example, there may be a first gap distance $g_1$ when stowed in the cruise configuration, and a second gap distance $g_2$ when moved into the lift configuration. The gap g may be exist between two chosen reference points on propeller 312 and boom surface 323. For example, the gap g may be taken between an upper or lower surface of hub 340 and the point on boom surface 323 directly below it. For propellers that comprise multiple hubs, for example four or six-bladed propellers, the gap g may be taken between an upper or lower surface of the lowest hub and the point on boom surface 323. In some embodiments as discussed below, boom surface 323 may comprise an opening configured to allow hub 340 to retract partially inside boom 322, such that there may be no point on boom surface 323 "directly below" the hub 340. Thus in some embodiments, the gap g may be taken between an upper or lower surface of hub 340 and the plane of the opening below it. Similarly, the gap g may be taken between an outer edge of blade 320 and the point on boom surface 323 directly below. In some embodiments, first gap distance $g_1$ may be, e.g., 0.25" or less, or 0.5", 1", 2", 3" or more. Second gap distance $g_2$ may be, e.g., 2", 3" 4", 5", 6", 8", 10", 12", 16" or 20" or more. In some embodiments, a ratio $g_2/g_1$ may be, e.g., 2, 3, 4, 5, 10, 20, 50, 100 or more.

Because both propeller 312 and boom 322 may comprise complex surfaces, the magnitude of a gap distance g and the relationship between $g_1$ and $g_2$ may depend largely on the reference points chosen to represent said gaps. Therefore, in some embodiments, it may be preferable to characterize the change from lift to stowed in terms of a total translation distance of propeller 312, either in relative or absolute terms. For example, the distance between a fully retracted propeller 312 in the stowed configuration and a fully extended propeller 312 in the lift configuration may be, e.g., 2", 3" 4", 5", 6", 8", 10", 12", 16" or 20" or more. The total translation distance may be a function of the propeller 312 radius, where the radius is measured from a center of hub 340 to the outermost point of propeller blade 320. In some embodiments, the total translation distance may be at least, e.g., 2%, 5%, 8%, 10%, 15%, 20%, 25%, 30%, 40%, 50%, 60%, 75% or more of the propeller 312 radius.

In some embodiments, the shift between stowed and lift configurations may be characterized by the relative positions or states of components between one configuration and another. For example, as seen in FIG. 3A, a shaft 350, or portions of it, may be shielded from airflow in the stowed configuration but exposed in the lift configuration. This may be advantageous in that the shielded state may reduce excrescence drag around the shaft surface in cruise. It may further allow greater design freedom in shaft 350 because the shaft's diameter or other features may no longer impact cruise drag. For example, a shaft 350 diameter may be made larger than would be feasible if the shaft were continuously exposed to airflow during cruise. This may improve torsional strength and power transfer between the motor assembly 330 and propeller 312. It may also enable a longer translation distance of propeller 312 between the lift and stowed configurations.

Alternatively, as shown in later figures, a moving part of the lift propeller 312 or motor assembly 330 may cross a stationary feature on the boom 322 or other surface of VTOL aircraft 300. For example, a portion of blade 320, motor assembly 330, hub 340, or shaft 350, may be located below a reference feature in the stowed configuration and above the reference feature in the lift configuration. The reference feature may be, e.g., a shield surface 324 (not shown in FIG. 3A). In some embodiments, such as shown in FIG. 3D below, the reference feature may be a boom surface 323 or other component that marks the boundary between an interior and exterior of boom 322.

In FIG. 3A, a translation between stowed and lift configurations may be achieved by a relative movement between shaft 350 and at least one of motor assembly 330 and hub 340. For example, hub 340 may comprise a sleeve (not shown) configured to fit over and slide along shaft 350. Alternatively, hub 340 shaft 350 may remain fixed with respect to each other, while shaft 350 slides through motor assembly 330. Shaft 350 may comprise a linear translation section such as, e.g., a splined section configured to allow these relative movements. Further structural details are discussed with respect to FIGS. 4A-5E below.

In some embodiments, the relative movement may be achieved using, e.g., active components such as electric actuators. However, in other embodiments the movement may be performed passively. For example, lift propeller 312 may be raised entirely by the lifting force generated from blades 320 when they begin rotating. Beginning from, e.g., a takeoff position on ground, lift propellers 312 may be rotated until a lifting force overcomes any opposing forces, such as gravity or a passive vertical displacement device as discussed below. When the propeller 312 is fully extended into a static position, the lifting force may be transferred to VTOL aircraft 300 and the craft may ascend or hover. When transitioning out of the lift configuration, such as to a stowed configuration, lift propeller may reduce its rotational speed, cease rotating, or spin freely to a stop. As the lifting force falls below the opposing forces, lift propeller may sink back into a fully retracted position and be rotated into alignment with boom 322.

In some embodiments, a speed profile of lift propeller 312 may have a gradual slope to avoid jarring vibrations when transitioning between lift and stowed configurations. For example, during takeoff, the lift propeller may rotate at an initial speed below a maximum speed. For example, the initial speed may be sufficient to gradually raise the lift the propeller 312 into the lift configuration without slamming into the fully extended state. The same may be true when retracting the blades. Rotational speed may be gradually reduced to lower the lift propeller gently into a retracted position. In some embodiments, mechanical dampers may be provided to facilitate a smooth transition between lift and stowed configurations.

Figure 3B:
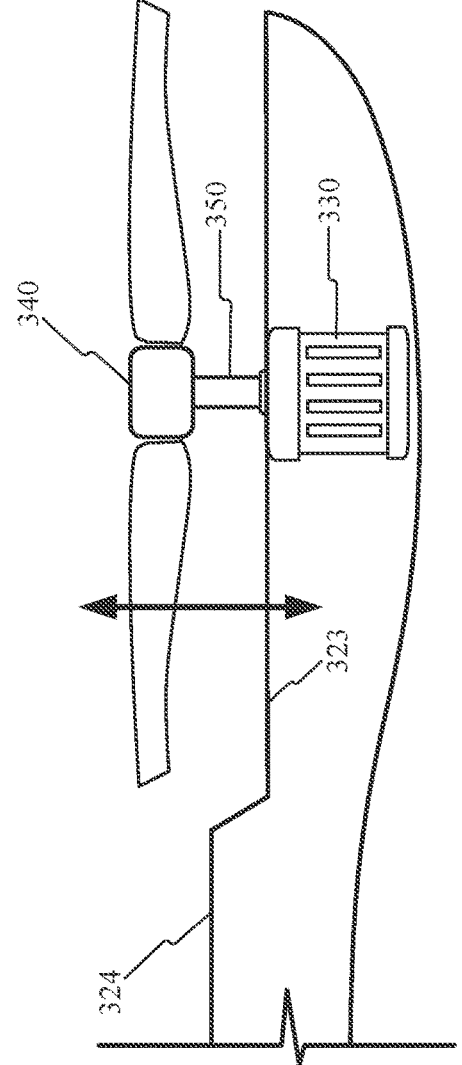
Figure 3B:
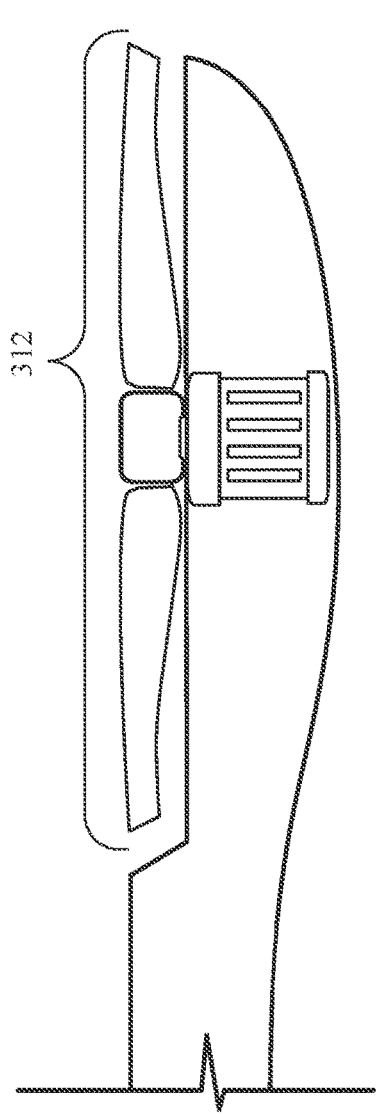
Figure 3C:
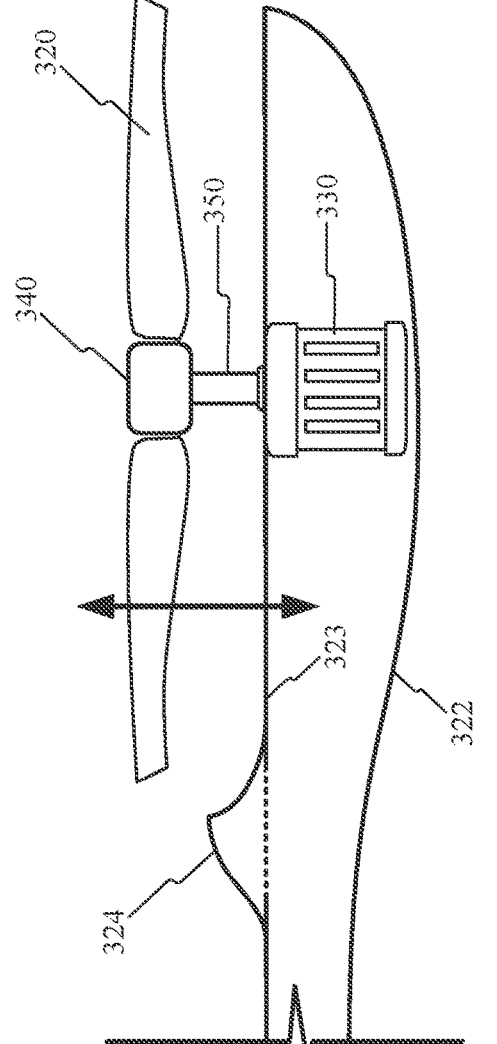
Figure 3C:
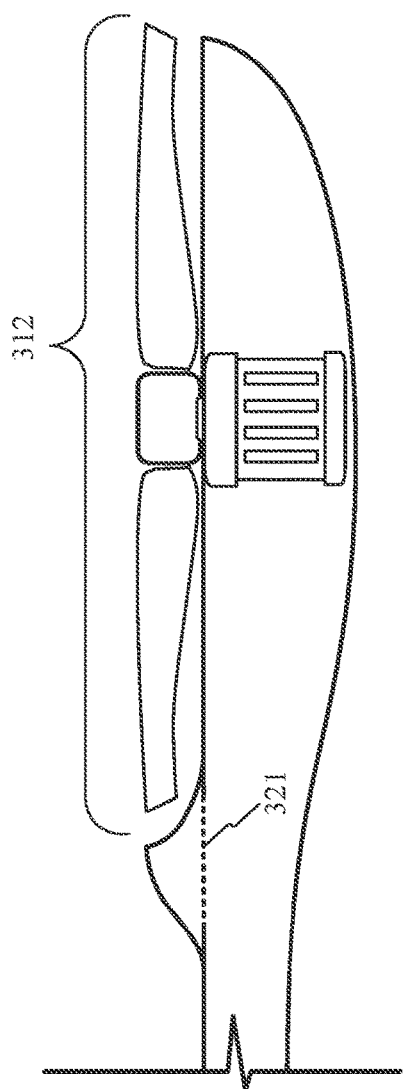
Figure 3D:
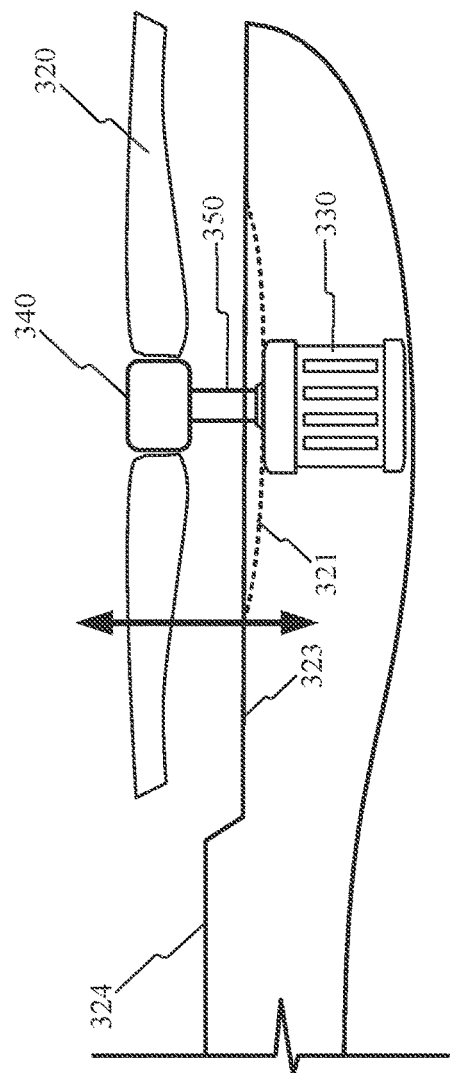
Figure 3D:
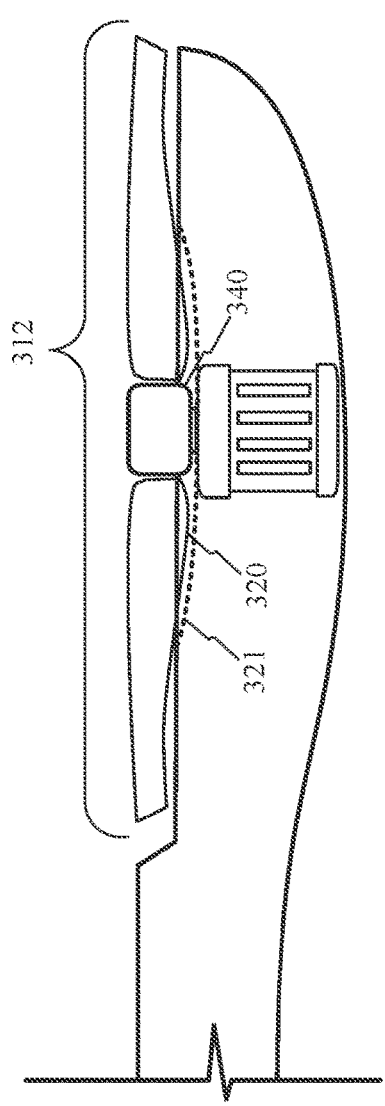

FIGS. 3B-C illustrate further embodiments of lift propeller 312 in lift and stowed configurations, consistent with embodiments of the present disclosure. The illustrated embodiment of FIGS. 3B-C may include a shield surface 324 configured to block or divert airflow in front of lift propeller 312.

Shield surface 324 may comprise a portion of boom 322 that is raised with respect to boom surface 323. Alternatively, shield surface 324 may comprise a portion of a wing or other component of VTOL aircraft 300. Shield surface may comprise a substantially continuous section of the outer contour of, e.g., boom 322. For example, as shown in FIG. 3B, shield surface 324 may comprise a raised portion of a continuous surface contour that leads from shield surface 324 in front of propeller 312 to boom surface 323 below propeller 312. Alternatively, as shown in FIG. 3C, shield surface 324 may comprise a windscreen, fairing or other element extending from boom 322 to redirect airflow above blades 320. In some embodiments, a shield surface 324 as seen in FIG. 3C may additionally serve as a scoop configured to receive downwash from propeller 312 in the lift configuration. The downwash may be directed through air inlet 321 into boom 322 as cooling air for motor assembly 330, as further discussed with respect to FIGS. 7A-I.

As mentioned above, shield surface 324 may serve as a stationary reference feature that is crossed by a moving feature during transitions between the lift and stowed configurations. For example, when fully retracted in the stowed configuration at the bottom of FIGS. 3B-C, the top of blade 320 may be at or below a level of the top of shield surface 324. When fully extended in the lift configuration at the top of FIGS. 3B-C, the top of blade 320 may be above a level of the top of shield surface 324. Alternatively, the moving feature may be, e.g., a bottom of blade 320, the entire blade 320, or a top, bottom, or entirety of hub 340, shaft 350, or motor assembly 330.

Further, the stationary feature may be a feature other than shield surface 324. FIG. 3D illustrates a further embodiment of lift propeller 312 in lift and stowed configurations, consistent with embodiments of the present disclosure. In FIG. 3D, the stationary feature may be a portion boom surface 323 located within the circumference of lift propeller 312. The moving feature may be, e.g., a portion of hub 340 or blades 320. For example, as seen at the bottom of FIG. 3D, a radially inward section of blades 320 may sit below boom surface 323 inside boom 322 during cruise. The blades may retract inside boom 322 through opening 365. In some embodiments, opening 365 may be sized and shaped to accept the radially inward section of blades 320 at any rotational angle, so that blades 320 can spin freely when in the fully retracted position. This may allow passive lifting and retraction of lift propeller 312. It may also make VTOL aircraft 300 capable of safe flight even in the event of a failure in active lifting mechanisms such as electric actuators. In some embodiments, opening 365 may made just large enough to allow the blades to be stowed or rotated, as it may be preferable to cover as much of opening 365 as possible during cruise to reduce drag.

Figure 3E:
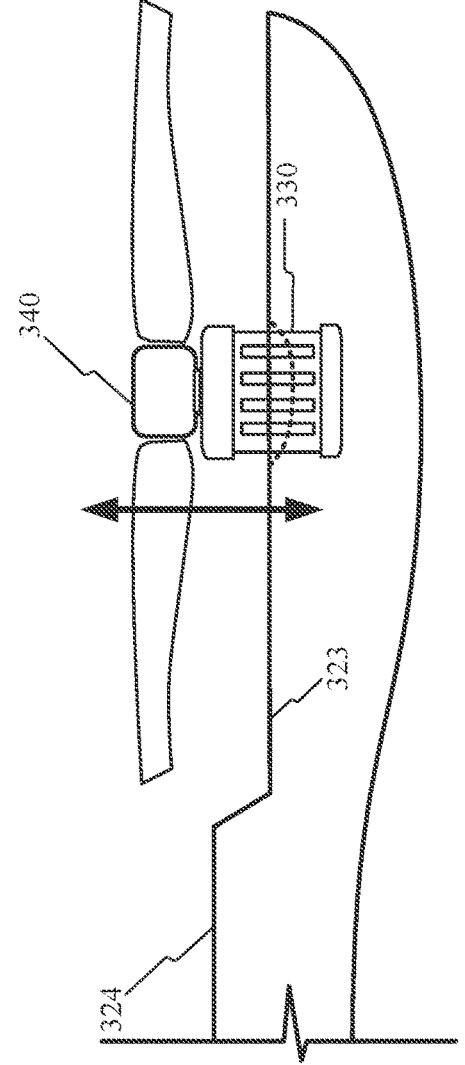
Figure 3E:
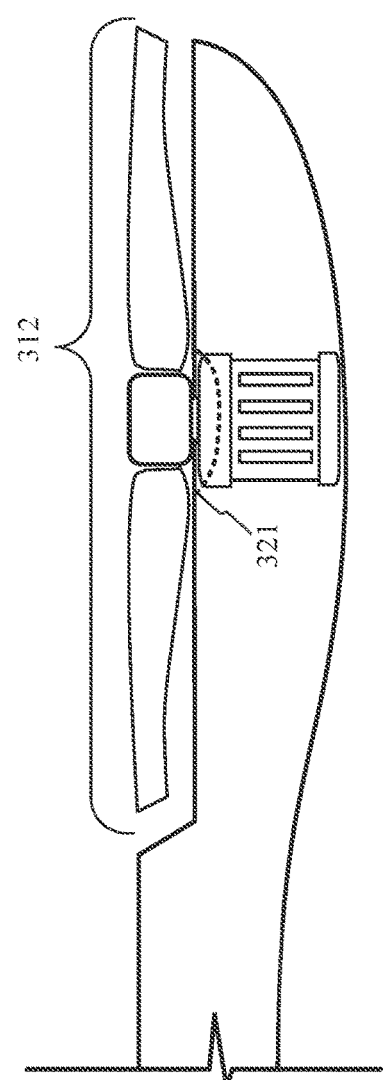

FIG. 3E illustrates a further embodiment of lift propeller 312 in lift and stowed configurations, consistent with embodiments of the present disclosure. In FIG. 3E, an entire motor assembly 330 may be moveable along with lift propeller 312 between the lift and stowed configurations. This arrangement may be advantageous in that it does not require shaft 350 to be extended or separately movable along its axis, which may simplify the design of motor assembly 330 and ensure optimal power transfer to lift propeller 312. A further advantage may be that at least part of motor assembly 330 may be exposed to external air during the operational periods when cooling requirements are highest.

Motor assembly 330 may be raised and lowered through opening 365 in boom surface 323, and be guided by, e.g., rails or mechanical linkages. Further structural details according to some embodiments of the present disclosure are provided at FIGS. 6A-C.

Figure 3F:
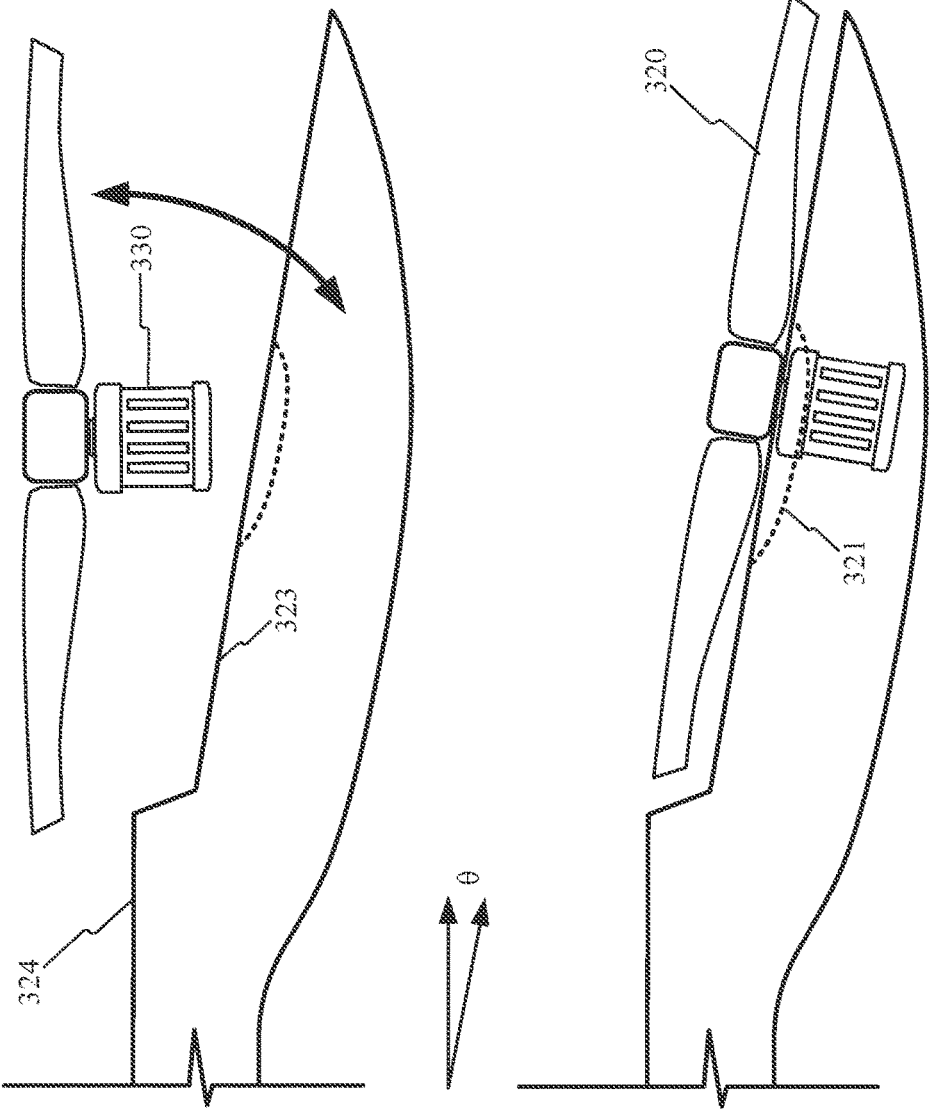

FIG. 3F illustrates a further embodiment of lift propeller 312 in lift and stowed configurations, consistent with embodiments of the present disclosure. In FIG. 3F, lift propeller 312 may be set at a first plane of rotation when in the stowed configuration and a second plane of rotation when in the lift configuration. The first and second planes of rotation may be offset by an angle θ. For example, motor assembly 330 may be mounted on a mechanical linkage (see e.g. FIG. 6C) so that it may be stowed at the angle θ from horizontal in the stowed configuration to reduce drag cause by airflow under blades 320. Likewise, boom surface 323 under lift propeller 312 may be offset from a horizontal axis of VTOL aircraft 300 by substantially the same angle. In some embodiments, lift propeller 312 may be configured to change its orientation, passively or actively, by an angle θ of, e.g., 2°, 3°, 5°, 10°, 15°, 20°, 25° or more.

Figure 3G:
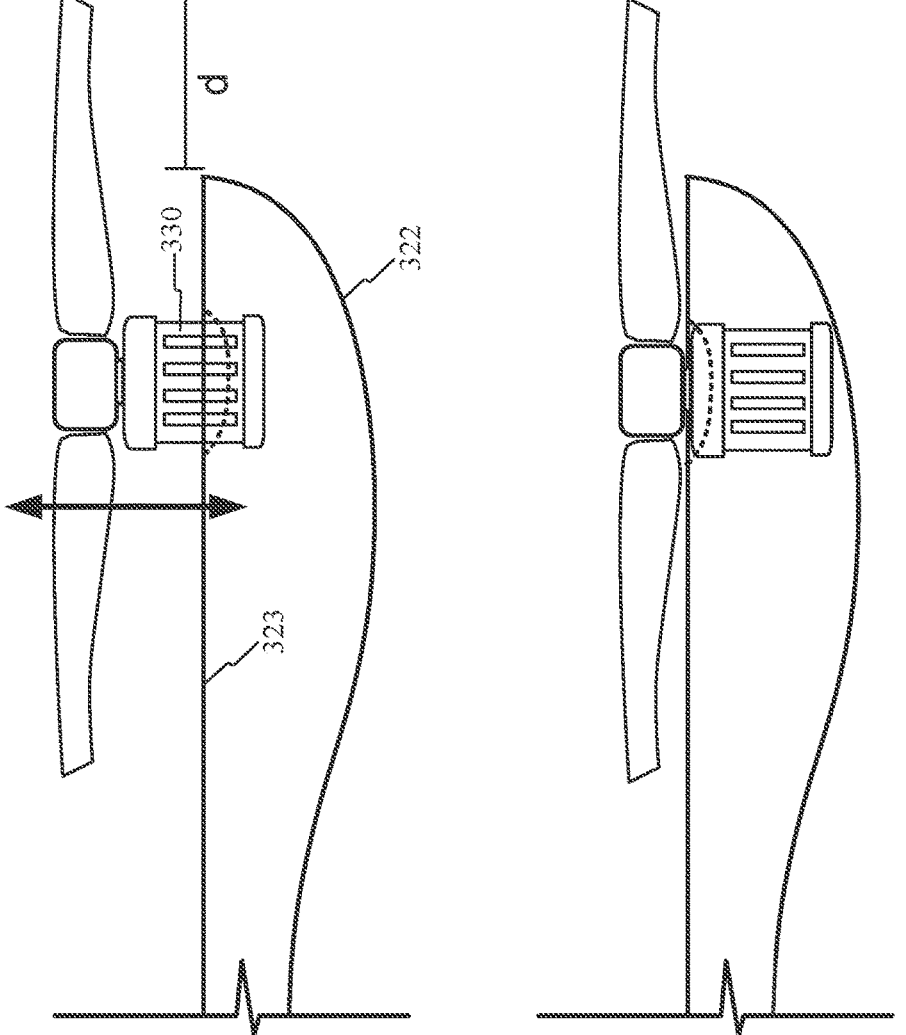

Further, boom 322 need not extend across a full length of lift propeller 312. FIG. 3G illustrates a further embodiment of lift propeller 312 in lift and stowed configurations, consistent with embodiments of the present disclosure As seen in FIG. 3G, propeller blades 320 may extend beyond an end of boom 322 by some distance d. In this case, drag may be greatly reduced simply by retracting the propeller 312 close to boom surface 323 or behind a shield surface 324 (not shown in FIG. 3G), as well as by maintaining a small size of boom 322 itself. In some embodiments, a distance d may be at least 2%, 5%, 10%, 20%, 30%, 40%, 50%, 60%, 70%, 80%, 90% or more of the propeller radius.

Figure 3H:
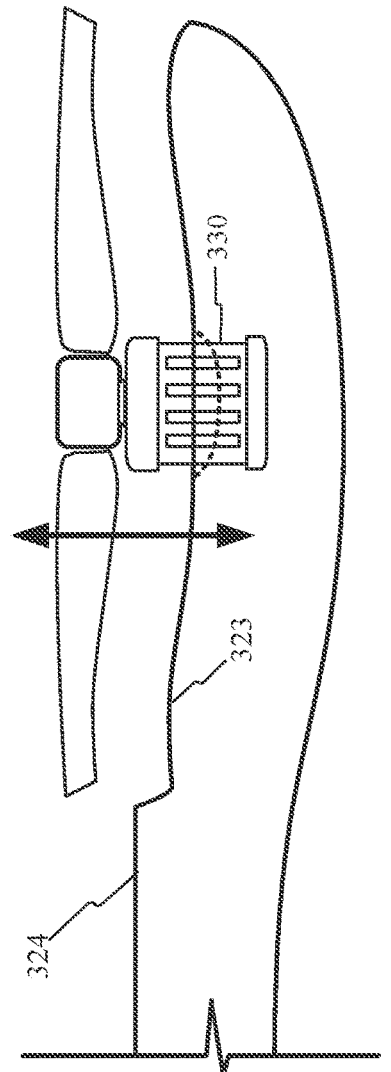
Figure 3H:
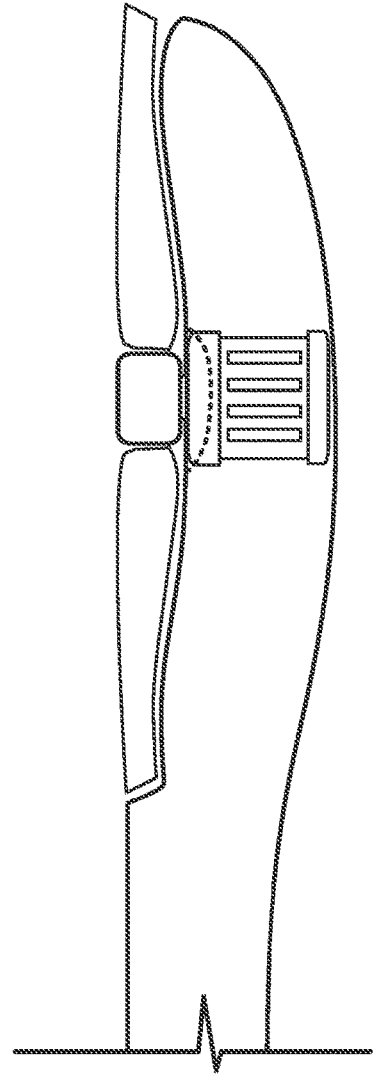

Additionally, boom surface 323 need not be a flat or simple geometry. FIG. 3H illustrates a further embodiment of lift propeller 312 in lift and stowed configurations, consistent with embodiments of the present disclosure. As seen in FIG. 3H, a contour of boom surface 323 may follow a contour of lift propeller 312. This may allow for a minimal gap distance between blades 320 and boom surface 323 along, e.g., a full length of the surface. In some embodiments, this contour matching may not extend to three dimensions. For instance, blade 320 may have a varying blade angle along its length, or may comprise other twists or complex surface features. In some embodiments, to allow blades 320 to spin freely along boom surface 323 in the fully retracted position, the highest line in the contour of boom surface 323 may substantially take the form of a two-dimensional projection of the three-dimensional propeller surface.

While certain features of FIGS. 3A-H may be depicted with respect to one embodiment, or fewer than all embodiments, it should be appreciated that other combinations of the various disclosed features are contemplated within the scope of the present disclosure, as would be understood by persons having ordinary skill in the art. For example, the various embodiments of opening 365, boom 322, boom surface 323, shield surface 324, blades 320, motor assembly 330, hub 340, and shaft 350 may be combined with each other in numerous ways, for example to achieve the various advantages of the different configurations of each component.

B. Example Hub Retraction Embodiments

FIGS. 4A-E illustrate portions of a VTOL aircraft 400, consistent with embodiments of the present disclosure. VTOL aircraft 400 may be, e.g., similar to VTOL aircraft 100-300 of FIGS. 1A-3H. Elements in FIGS. 4A-E that are similar to those in FIGS. 1A-3H may be labeled with corresponding numbers using 4 as the leading digit. For example, in some embodiments, hub 440 of FIGS. 4A-E may correspond to, e.g., hub 340 of FIG. 3A.

FIGS. 4A-E illustrate example configurations of a system for passively extending and retracting a hub 440 of a lift propeller 412 along a shaft 450, consistent with embodiments of the present disclosure. In some embodiments as illustrated with respect to, e.g., FIGS. 4A-B, hub 440 may comprise a sleeve 441 configured to mate with a splined section 451 of shaft 450. Splined section 451 may begin at, e.g., an exterior of motor assembly 430 or a component thereof, such as a motor or gearbox. This may provide a smooth surface of shaft 450 at an exit point of motor assembly 430 to enable easy sealing of motor assembly 430 at the shaft exit point. A thrust cap 442 having thrust bearings 443 may be configured to surround sleeve 441. Thrust cap may be mounted to, e.g., motor assembly 430 or a structural component of VTOL aircraft 400. Hub 440 may further comprise a passive vertical displacement device 454 configured to apply a downward force on lift propeller 412. As an example, in FIGS. 4A-B, passive vertical displacement device 454 may comprise a tension spring.

Figure 4A:
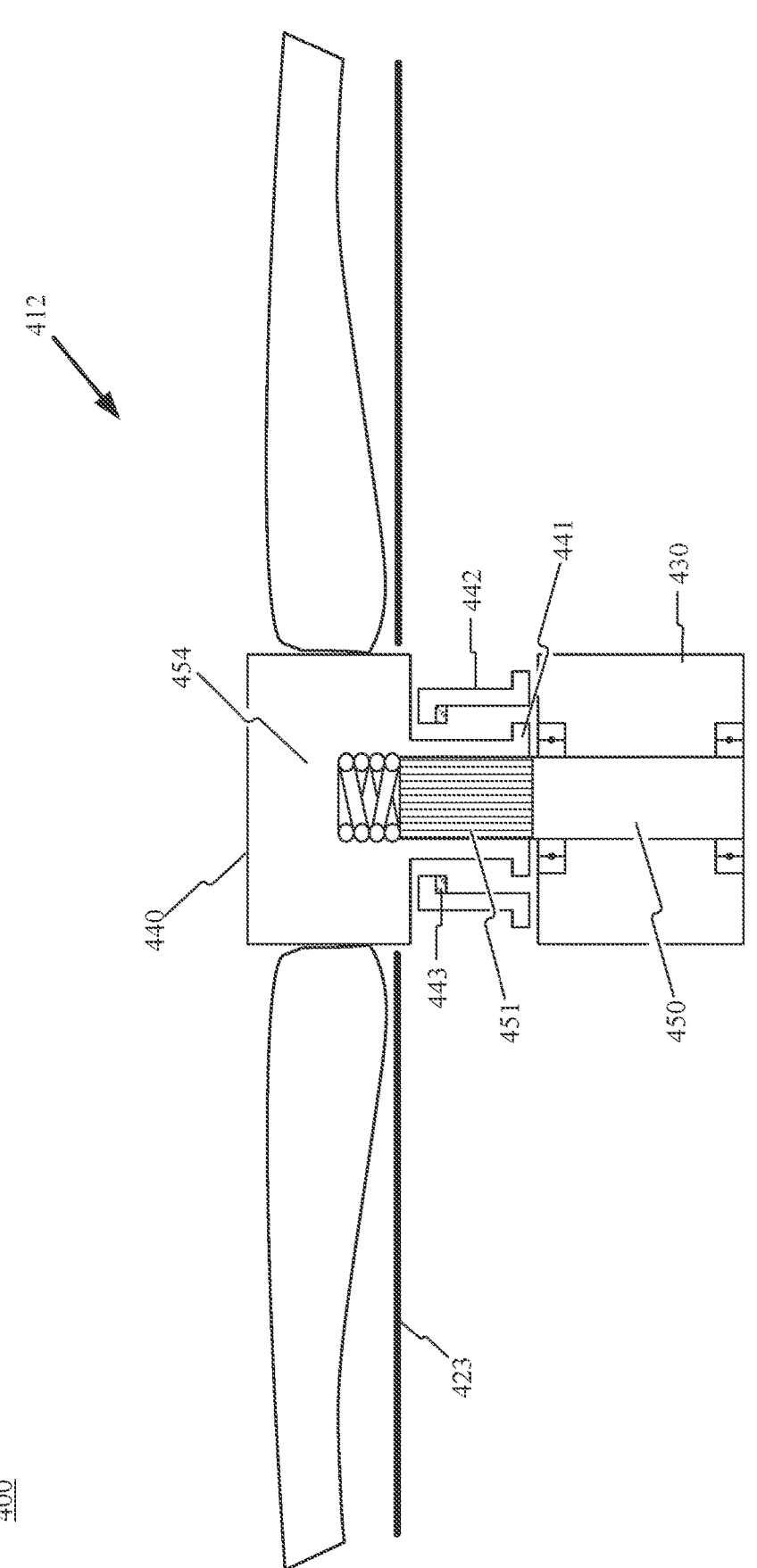
Figure 4B:
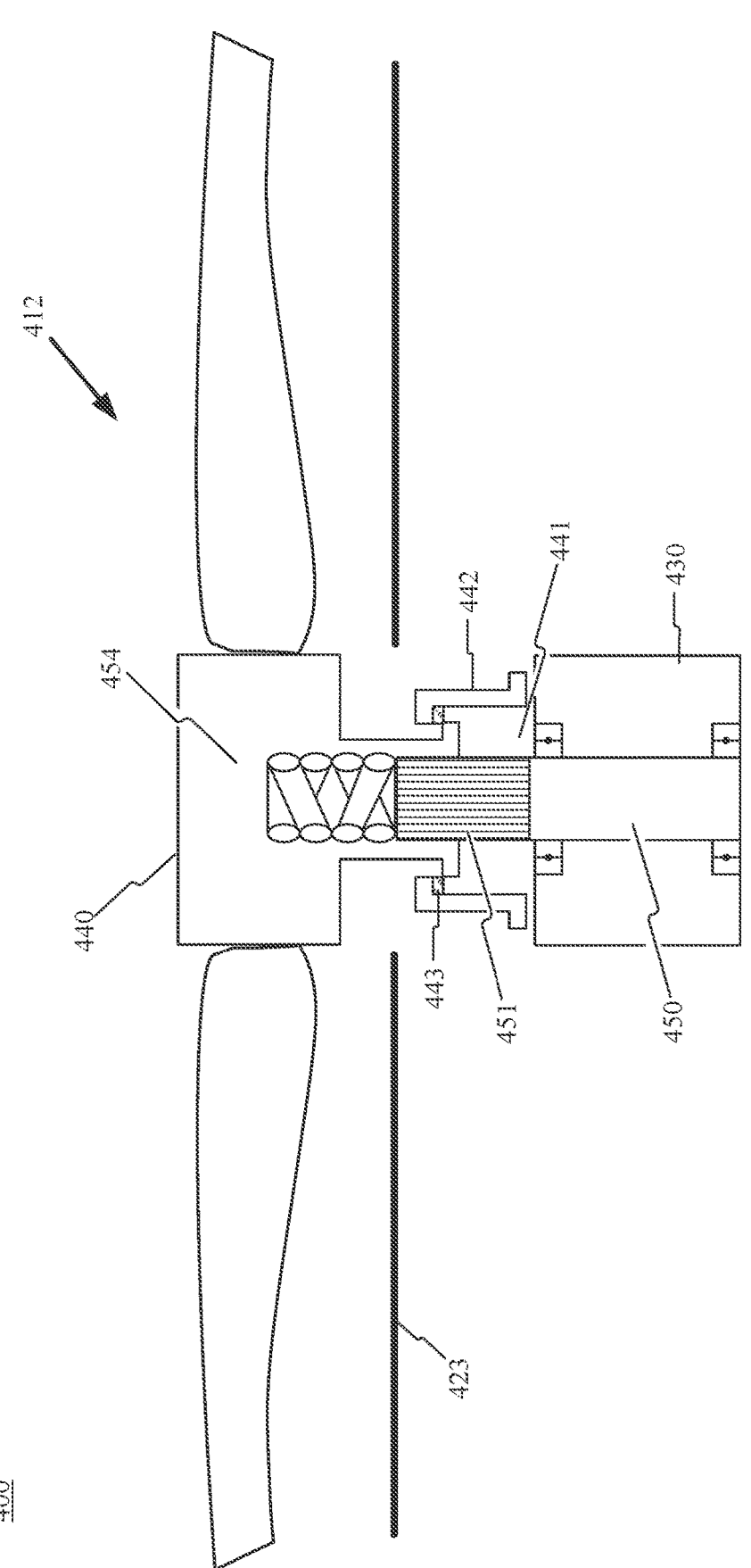

When lift propeller 412 begins rotating to generate an upward lifting force, sleeve 442 may slide along splined section 451, extending passive vertical displacement device 454 as it moves. When lift propeller 412 is stopped at its maximum translation distance, it may be in the lift configuration as shown at FIG. 4B. For example, a sleeve 441 may be stopped when flanged portion of sleeve 441 meets thrust bearings 443. At this point, the lifting force of lift propeller 412 may be transferred via thrust cap 441 to provide lift to VTOL aircraft 400. When the lifting force of lift propeller 412 falls below an opposing force from, e.g., gravity or passive vertical displacement device 454, lift propeller 412 may return to the retracted position shown in FIG. 4A. In some embodiments, gravity alone may act as the opposing force to return lift propeller 412 to the retracted position. In some embodiments, the force of gravity alone may provide stronger opposing force than is desired. Therefore, some embodiments of the present disclosure may provide a dampener, weight compensation mechanism, or other device configured to partially counteract the opposing force of gravity.

Figure 4C:
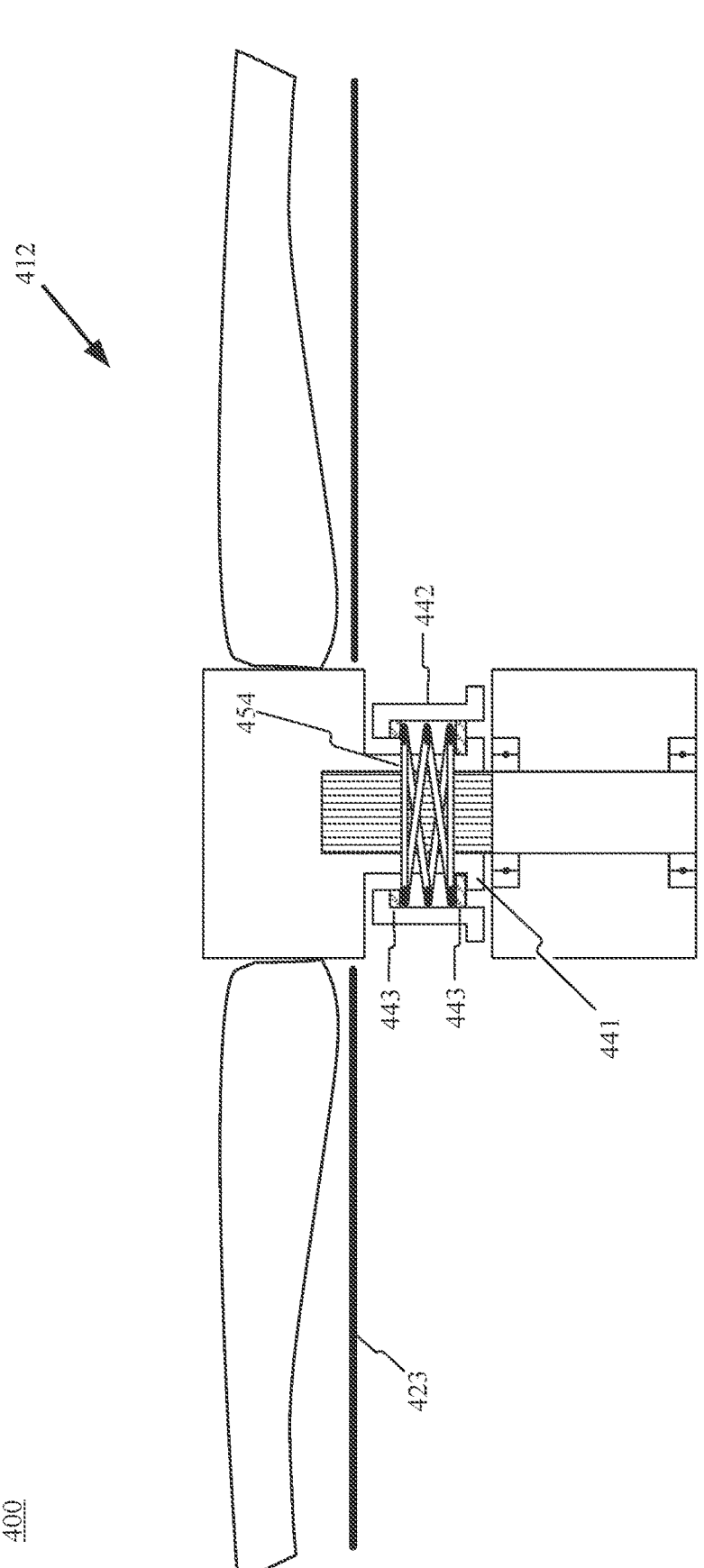
Figure 4D:
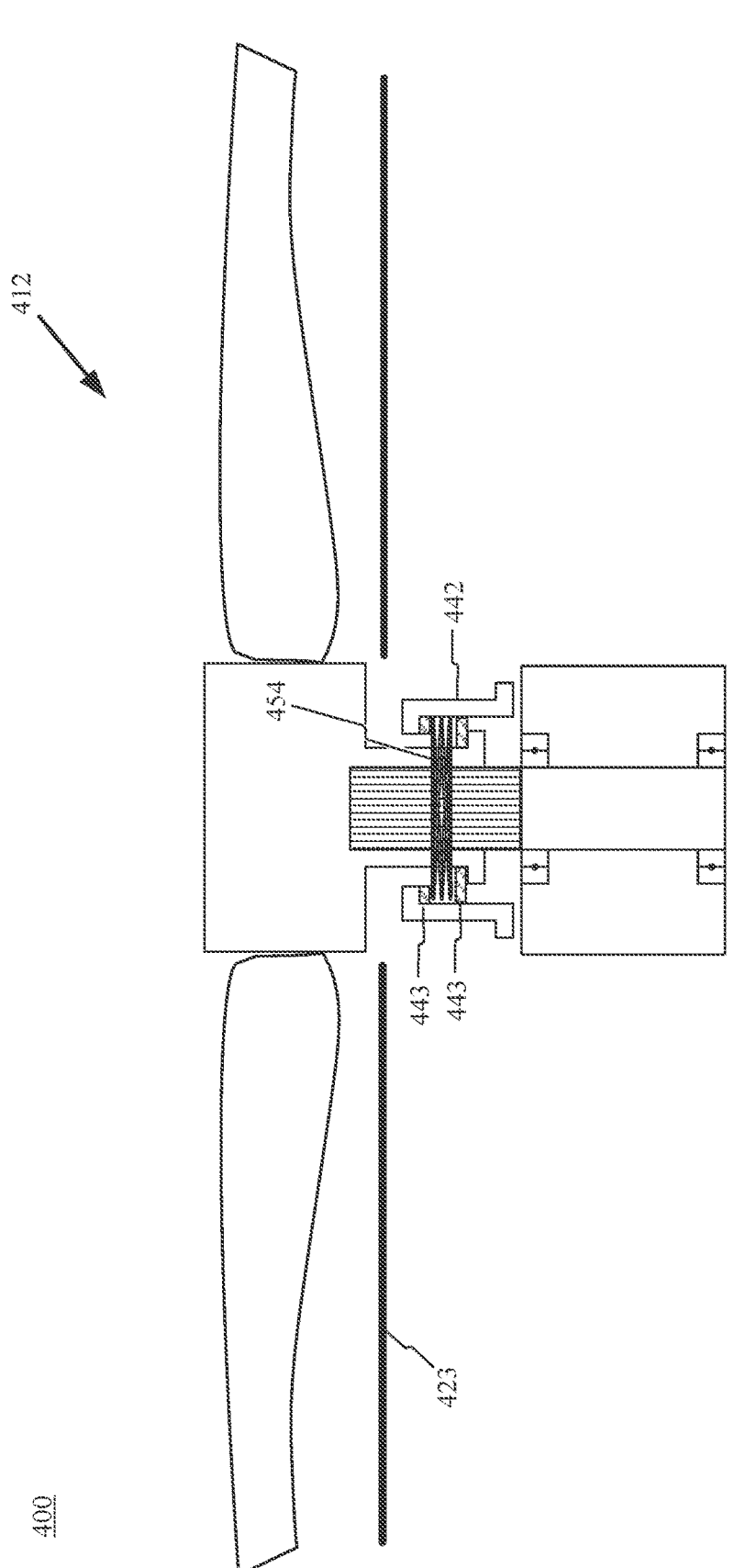

FIGS. 4C-D illustrate a further embodiment of lift propeller 312 in lift and stowed configurations, consistent with embodiments of the present disclosure. In FIGS. 4C-D, passive vertical displacement device 454 may comprise, e.g., a compression spring instead of the tension spring of FIGS. 4A-B. For example, the compression spring may be located inside thrust cap 442 and wrapped around sleeve 441. A further set of thrust bearings 443 may be placed on an underside of passive vertical displacement device 454. Operation of the lift propeller may be substantially similar to that described above with respect to FIGS. 4A-B. For example, lift propeller 412 may be raised into a lift configuration when passive vertical displacement device is fully compressed as illustrated at FIG. 4D. When the lifting force from lift propeller 412 falls below the opposing force of, e.g., gravity and the spring force, lift propeller 412 may be forced back into the stowed configuration as seen in FIG. 4C.

It should further be understood that passive displacement device 454 may comprise elements other than springs, and further that some embodiments may utilize active displacement devices, alternatively or in addition to passive displacement device 454. For example, metallic springs, air spring or metallic spring, hydraulic cylinders or any mechanism for applying a biasing force may be used to urge lift propeller 412 into the lift or stowed configurations.

Figure 4E:
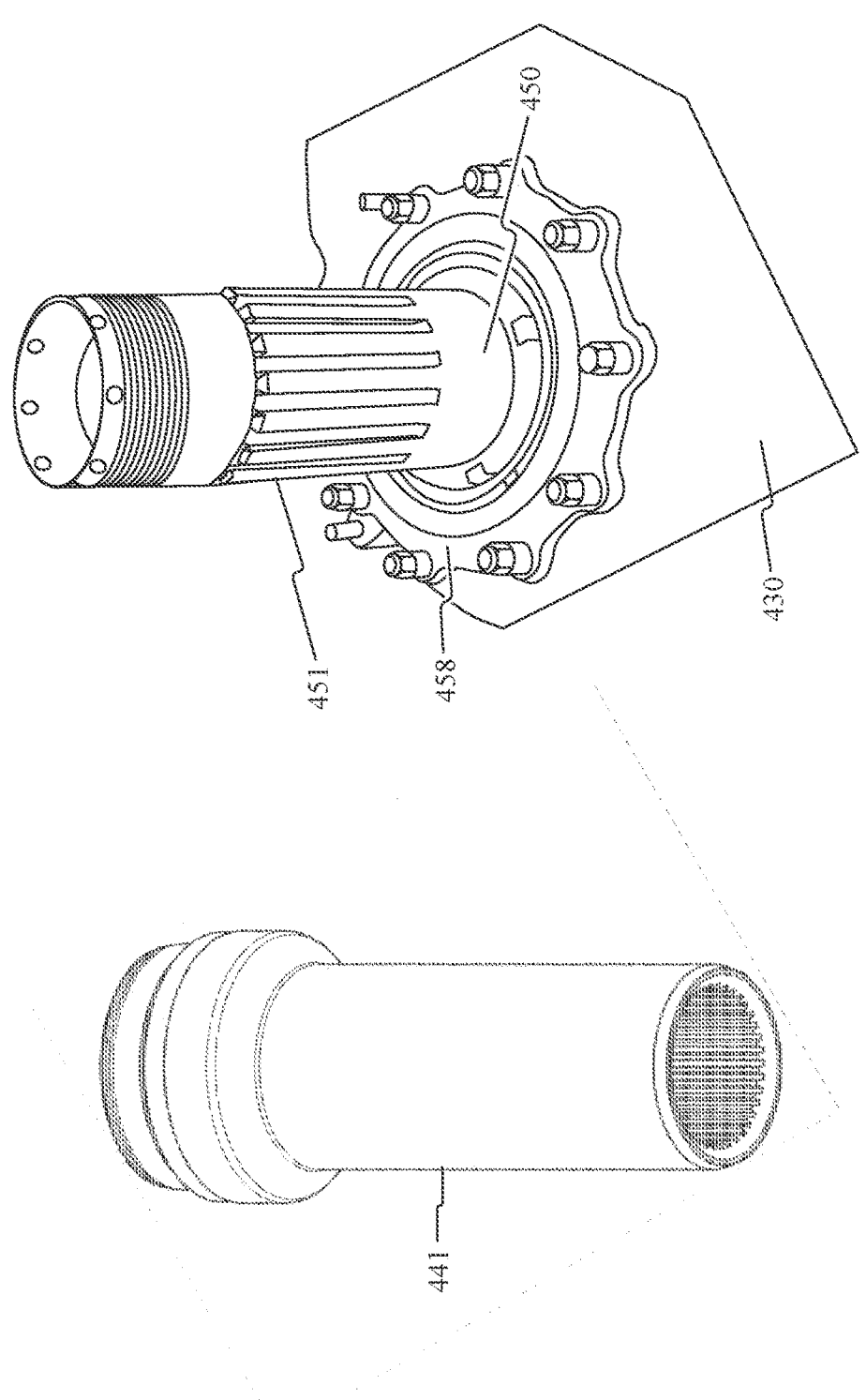

FIG. 4E illustrates an example configuration of a sleeve 441 and splined section 451, consistent with embodiments of the present disclosure. Splined section 451 may comprise a series of vertical ridges and grooves configured to fit with a corresponding set of vertical ridges and grooves inside sleeve 441. Splined section may terminate at a smooth section of shaft 450 where it enters a top of motor assembly 430 through a seal 458. The grooves and ridges of splined section 451 and sleeve 441 may engage each other to transfer torque to a lift propeller while retaining freedom of movement along the axial direction of shaft 450. In some embodiments, other mechanical systems for coupling a shaft to a lift propeller may be used as would be understood by persons having ordinary skill in the art, such as keyed shafts, hexagonal shafts, etc. In general, the shaft may comprise a linear translation section configured to configured to allow linear translation of the lift propeller while transmitting torque to the lift propeller.

C. Example Pass-Through Shaft Embodiments

FIGS. 5A-E illustrate portions of a VTOL aircraft 500, consistent with embodiments of the present disclosure. VTOL aircraft 500 may be, e.g., similar to VTOL aircraft 100-400 of FIGS. 1A-4E. Elements in FIGS. 5A-E that are similar to those in FIGS. 1A-4E may be labeled with corresponding numbers using 5 as the leading digit. For example, in some embodiments, hub 540 of FIGS. 5A-E may correspond to, e.g., hub 340 of FIG. 3A.

Figures 5A, 5B:
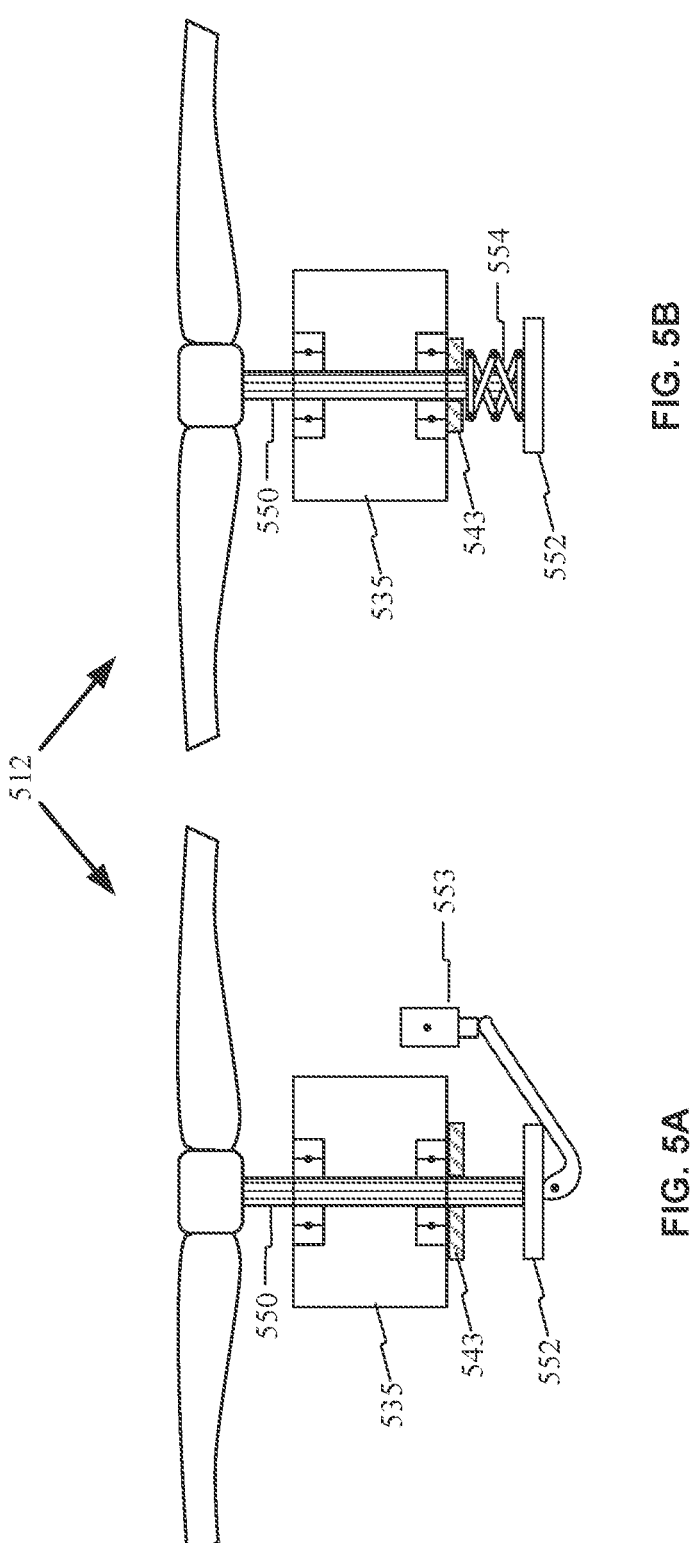

FIGS. 5A-B illustrate example configurations for extending and retracting a lift propeller 512 along a pass-through shaft 550, consistent with embodiments of the present disclosure. FIGS. 5A and B illustrate example active and passive embodiments, respectively.

In FIG. 5A, shaft 550 may be actuated to pass through, e.g., motor 535 as a splined output shaft 550 of motor 535. In some embodiments, a gearbox may be included as discussed above, and shaft 550 may be an output shaft of the gearbox. An actuator 553 may be provided to apply a linear actuation force at shaft stop 552 to move shaft 550 and lift propeller 512 vertically between extended and retracted positions to switch between lift and stowed configurations, respectively. When fully extended into the lift configuration, shaft stop 552 may be stopped at thrust bearings 543. Actuator 553 may include, e.g., an actuation arm as shown in FIG. 5A, or may act directly on the shaft 550 such as at shaft stop 552. The actuator may be any suitable type known to persons of ordinary skill in the art such as, e.g., an electric actuator, a hydraulic actuator, etc.

As shown in FIG. 5B, shaft 550 may be passively actuated by the lifting force of lift propeller 512. Like the configurations shown in FIGS. 4A-E above, a passive vertical displacement device 554 such as, e.g., a compression spring, may exert a downward pressing force on stop 552 to return lift propeller 512 to a retracted position for cruise. Alternatively, a tension spring may be provided below shaft stop 552 to pull the lift propeller back into the retracted position.

Figure 5C:
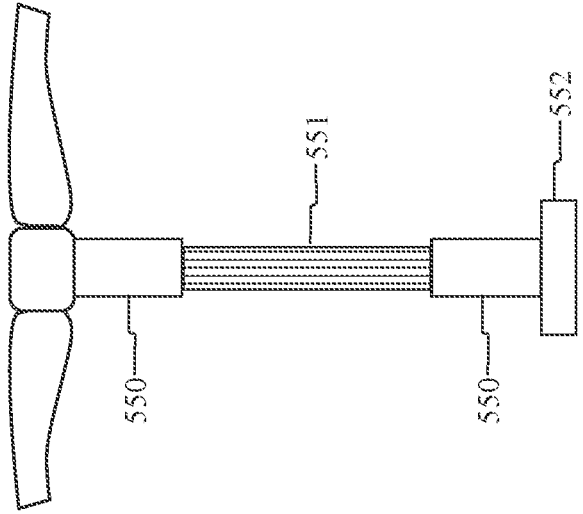
Figure 5C:
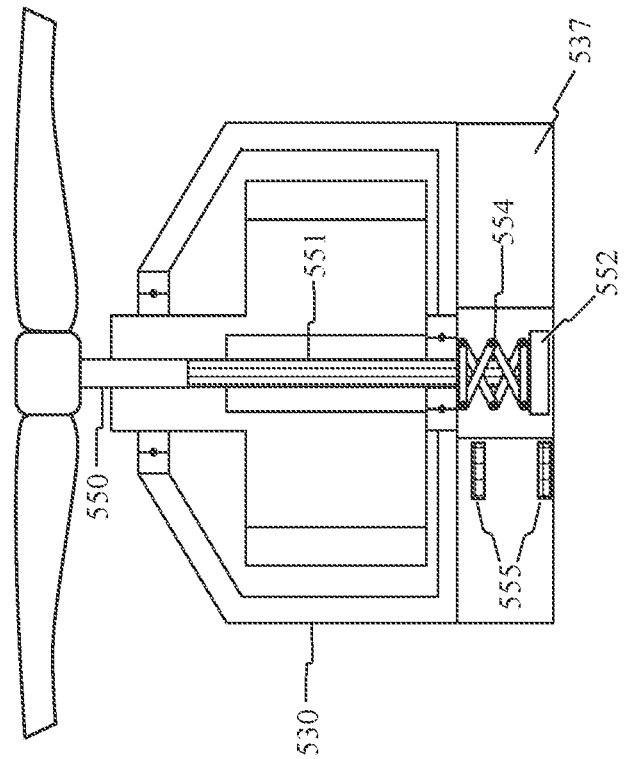

FIG. 5C illustrates further features in example configurations for extending and retracting a lift propeller 512, consistent with embodiments of the present disclosure. As seen on the left, shaft stop 552 and passive vertical displacement device 554 may be provided in, e.g., a central opening in inverter 537 or another structure of motor assembly 530. For example, the opening may be located in a casing or support structure rather than a functional component of the motor assembly itself. The inverter 537 or other component may comprise a sensor 555 configured to detect a state of lift propeller 512. For example, sensor 555 may comprise one or more elements configured to detect a presence of a reference element on shaft 550. In some embodiments, the reference element may be shaft stop 552 or a sensing target located on shaft stop 552. For example, sensor may comprise a first element configured to detect that the propeller is in a fully retracted position when shaft stop 552 is at the lowest position, and a second element configured to detect that the propeller is in a fully extended position when shaft stop 552 is at the highest position. In this way, sensor 55 may detect whether lift propeller 512 is in the lift configuration, the stowed configuration. Sensor 555 may detect that the lift propeller is in an intermediate configuration, such as by providing further intermediate detection elements, or by inference when lift propeller is neither fully extended or fully retracted. Sensor 555 may comprise, e.g., capacitive, inductive, optical, electrical, mechanical or electromechanical sensors, or any other type of position, presence or proximity sensor.

As seen on the right in FIG. 5C, shaft 550 may be smooth at either end with a splined section 551 in the middle. For example, shaft 550 may be smooth at the entry points of motor assembly 530 to seal the motor assembly easily. The splined section 551 may be present, e.g., only along the length of shaft 550 at which the splines may engage with motor assembly 530. For example, a length of splined section 551 may exceed the minimum length needed for engagement with motor assembly 530 by an amount corresponding to a translation distance of lift propeller 512, within a prescribed tolerance.

Figure 5D:
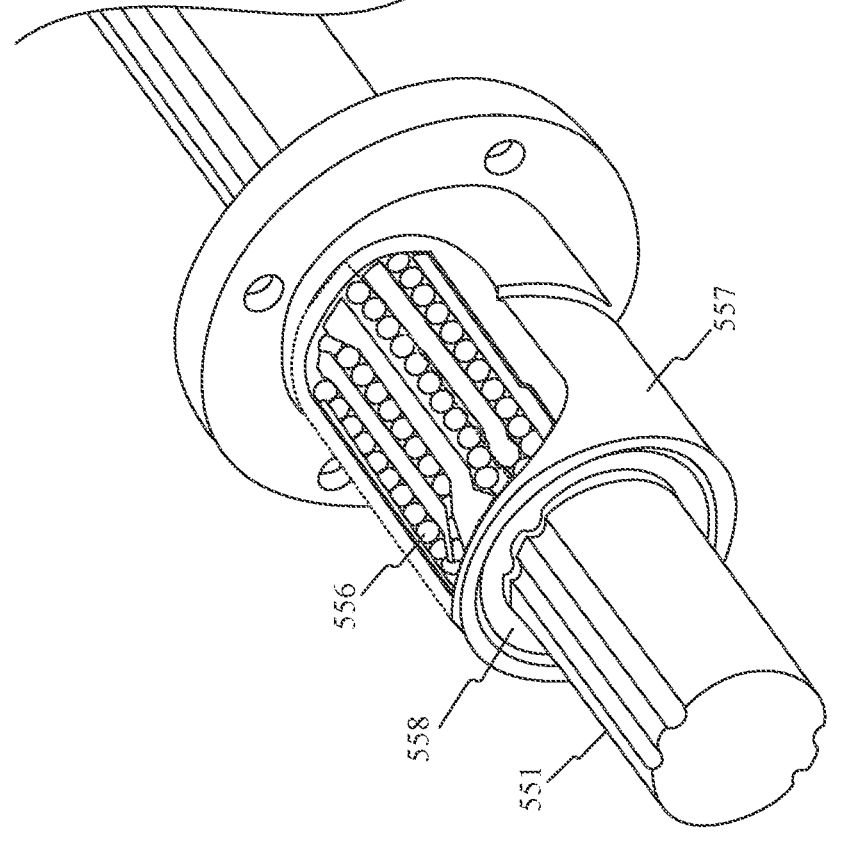
Figure 5E:
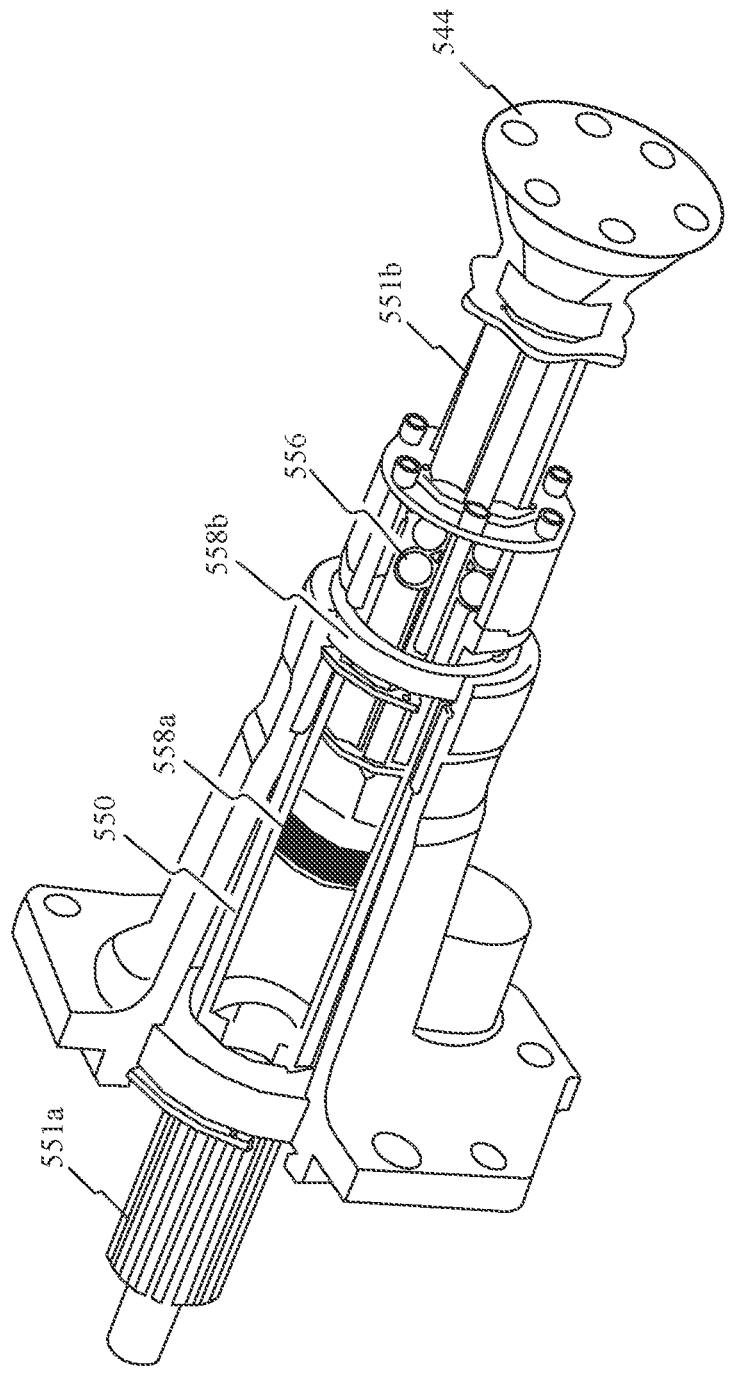

Alternatively, as shown in FIGS. 5D-E, a splined section 551 may exit a motor assembly via a ball spline. For example, in FIG. 5D a ball spline may comprise, e.g., balls 556, spline nut 557, and seal 558. Ball splines may allow shaft 550 to be lubricated using the motor oil inside motor assembly 530 while maintaining a seal at the shaft exit. Ball splines may advantageously provide a higher load capacity than other linear bearings. Further, as shown in FIG. 5E, a splined section 551 may comprise an integrated ball spline configuration. For example, shaft 550 may engage a motor at first splined section 551*a* to turn shaft 550. A second splined section 551*b* may fit inside shaft 550 and slide in an axial direction along gasket 558*a* and balls 556 to transfer torque to a lift propeller (not shown) via hub connection 544. Second splined section 551*b* may be sealed from seal 558*b*. Second splined section 551*b* may slide to extend a lift propeller into a lift configuration and retract it into a stowed configuration.

D. Example Motor Lifting Embodiments

FIGS. 6A-C illustrate portions of a VTOL aircraft 600, consistent with embodiments of the present disclosure. VTOL aircraft 600 may be, e.g., similar to VTOL aircraft 100-500 of FIGS. 1A-5E. Elements in FIGS. 6A-C that are similar to those in FIGS. 1A-5E may be labeled with corresponding numbers using 6 as the leading digit. For example, in some embodiments, motor assembly 630 of FIGS. 6A-C may correspond to, e.g., motor assembly 530 of FIG. 5C.

FIGS. 6A-C illustrate example configurations for extending and retracting a motor assembly 630 between lift and stowed configurations, consistent with embodiments of the present disclosure. For example, FIG. 6A illustrates an example slide rail configuration, while FIGS. 6B-C illustrate example mechanical linkage configurations.

FIG. 6A illustrates an example embodiment of lift propeller 612 in lift and stowed configurations, consistent with embodiments of the present disclosure. Motor assembly 630 and lift propeller 612 may be raised and lowered on rails 627 via slides 628. Slides 628 may comprise, e.g., linear bearings. Slides 628 may be coupled to motor assembly 630 by, e.g., mounts 634 while rails 627 may be coupled to boom 622. Alternatively, rails 627 may be coupled to motor assembly 630 and slides 628 may be coupled to boom 622.

Motor assembly 630 may be raised partially or completely out of boom 622. As discussed above with respect to FIGS. 3A-H, a component of motor assembly 630 may cross a reference feature such as a recessed boom surface 623 or a shield surface 624 when moving between the lift and stowed configurations.

In some embodiments, motor assembly may slide along two rails 627 as shown. Alternatively, more or fewer rails 627 may be provided. For example, in some embodiments, there may be three, four, or more rails spaced substantially evenly around motor assembly 630. Further, slides 628 may be coupled to each via a ring or other mounting bracket to reduce unwanted torsion or angular misalignments of lift propeller 612.

FIGS. 6B-C illustrate example embodiments of lift propeller 312 in lift and stowed configurations, consistent with embodiments of the present disclosure. Here, motor assembly 630 and lift propeller 612 may be raised and lowered via mechanical linkage 629. For example, as seen in FIG. 6B, linkage 629 may comprise a parallelogram four-bar linkage configured to raise and lower motor assembly 630 and lift propeller 612 while maintaining a same plane of rotation of lift propeller 612. On the other hand, as shown in FIG. 6C, linkage 629 may be configured to vary the plane of rotation between lift and stowed configurations as discussed above with respect to FIG. 3F. In general, any linkage system may be used as would be understood by persons having ordinary skill in the art.

Further, any of rails 627, slides 628, linkages 629 or motor assembly 630 may be biased into the stowed configuration by, e.g., a passive vertical displacement device as discussed above. For example, a tension or compression spring may be configured to force motor assembly 630 and lift propeller 612 into the stowed position when lift propeller 612 is not in use. The tension or compression spring may act directly on motor assembly 630, or may act on another moving component such as rails 627, slides 628, or linkages 629.

E. Example Motor Cooling Embodiments

FIGS. 7A-G illustrate portions of a VTOL aircraft 700, consistent with embodiments of the present disclosure. VTOL aircraft 700 may be, e.g., similar to VTOL aircraft 100-500 of FIGS. 1A-6C. Elements in FIGS. 7A-G that are similar to those in FIGS. 1A-6C may be labeled with corresponding numbers using 7 as the leading digit. For example, in some embodiments, motor assembly 730 of FIGS. 7A-G may correspond to, e.g., motor assembly 630 of FIG. 6A.

FIGS. 7A-G illustrate example configurations for cooling a motor assembly, consistent with embodiments of the present disclosure.

Embodiments discussed herein may be particularly useful where an entire motor assembly 730 is moveable along with lift propeller 712 between the lift and stowed configurations. For example, in some embodiments, a motor assembly 730 may be moved partially or completely outside of boom 722 when fully extended in the lift configuration. In some cases, this exposure itself may provide sufficient air contact to cool motor assembly 730. However, in some embodiments, motor assembly 730 may require a stronger airflow. For instance, a motor assembly that utilizes a gearbox system may be significantly smaller than a comparable motor assembly having no gearbox. While this size reduction may generally be desirable, it may also reduce the total surface area of motor assembly 730, which may reduce the total surface contact with cooling airflow. Furthermore, the downwash to motor assembly 730 from a central region of a lift propeller 712 may be weak compared to the stronger down-wash from the periphery.

Therefore, it may be advantageous to direct cooling air to the motor assembly from the stronger peripheral flow region of the blades 720. In some embodiments, motor assemblies discussed above may be cooled using air channel systems disclosed in, e.g., the above-incorporated U.S. Pat. No. 11,613,350. In some embodiments, air channel systems may further comprise features described below, e.g., to accommodate a motor assembly that is vertically moveable between the lift and stowed configurations.

Figure 7A:
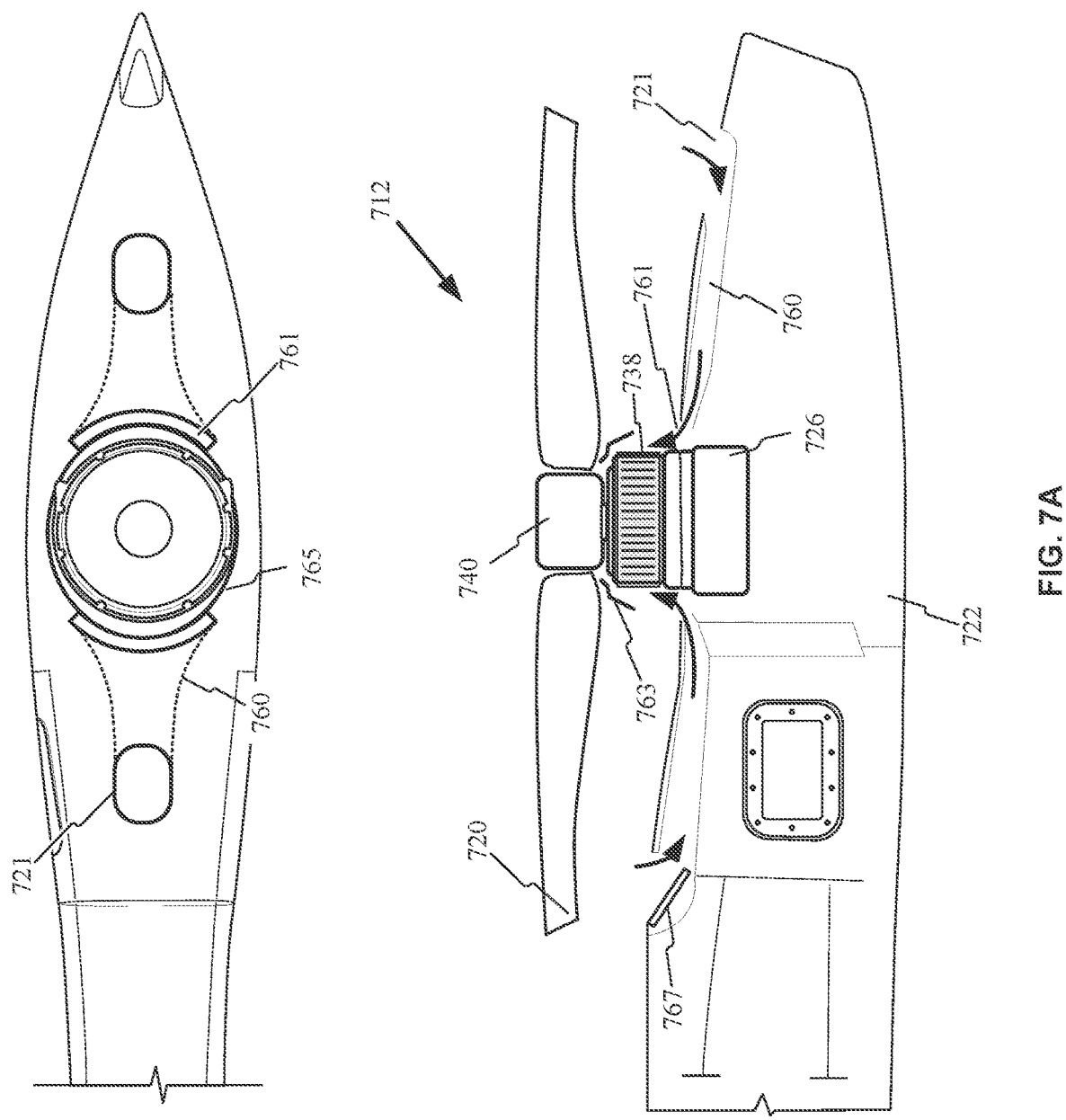

FIG. 7A illustrates a top and side view of portions of an example VTOL aircraft 700 when fully extended into a lift configuration, consistent with embodiments of the present disclosure. Boom 722 (or a fairing, not shown) may comprise one or more air inlets 721 configured to receive strong propwash from a peripheral region of blades 220, as indicated by arrows. The propwash may be directed by cooling channels 760 toward an air outlet, such as top outlets 761, where it may be further directed to thermal transfer device 738. Top outlets 761 may comprise, e.g., arcuate segments or a manifold of individual outlet holes. Alternatively or additionally, top outlets 761 may comprise an annular outlet that surrounds, or is integrated with, an opening 765 through which motor assembly 730 exits boom 722. Thermal transfer device 738 may comprise, e.g., a heat exchanger, cooling fins or another device as discussed above. The cooling air from top outlets 761 may pass over, through, or be exhausted from, thermal transfer device 738 to a central region under lift propeller 712. For instance, the air may be exhausted to the underside of hub 740 and be subsequently directed into a downwash region of blades 720. In some embodiments, the air may be directed into a blade root region having relatively little downwash.

In some embodiments, air inlet 721 or top outlet 761 may comprise a door configured to cover air inlet 721 and reduce drag during cruise when lift propeller 712 is not in use. Door 767 may be static, such as a slit or scoop. Alternatively, door 767 may be configured to open in the lift configuration and close in the stowed configuration, either actively or passively. For example, door 767 may be controlled to open and close by, e.g., an electric actuator. Door 767 may be mechanically coupled to lift propeller 712 or motor assembly 730 so that it opens and closes automatically when lift propeller 712 is raised and lowered. Door 767 may be biased into a first position by, e.g., a spring or gravity, and may move into a second position by the force of some airflow. For example, door 767 may be biased to a closed position. When lift propeller 712 generates downwash, the force of the downwash may open door 767 inwardly to allow cooling air into channel 760, as seen in FIG. 7A. This configuration may advantageously provide a simple and fail-safe system that will not interfere with blades 720, even when door 767 is fully opened and blades 720 are spinning in the fully retracted position.

Motor assembly 730 may further comprise a collar 763 configured to surround, e.g., thermal transfer device 738 or an upper section of enclosure 726. Collar 763 may be, e.g., substantially cylindrical or funnel-shaped. Collar 763 may be configured to divert the weak downwash at a central portion of blades 720 radially outward. At the same time, collar 763 may be configured to channel the upward flowing air from outlets 761 toward, e.g., thermal transfer device 738. Thus, collar 763 may prevent the weak central down-wash from interfering with the stronger upward moving air from top outlet 761. Collar 763 may further protect exposed portions of motor assembly 730 from damage by airborne objects during flight. Collar 763 may be sized to at least partially fit inside opening 765 for retraction into boom 722 in the stowed configuration. Alternatively, collar 763 may be configured to rest on top of boom 722 in the stowed configuration (for example, as seen in FIG. 7D).

In some embodiments, collar 763 may be subdivided into arcuate sections having independent flow channels. For example, collar 763 may be configured to funnel the central downwash through one or more first channels into a first portion of thermal transfer device 738, and to funnel the upward moving air through one or more second channels to a second portion of thermal transfer device 738. The upward moving air may be exhausted, e.g., under hub 740 as discussed above. This arrangement may allow a larger amount of available airflow to be utilized without interference from the conflicting flow directions.

In some embodiments, collar 763 may be flanged outward from top to bottom. For instance, collar 763 may have a first diameter at the top of collar 763 facing lift propeller 212, and a second diameter at the bottom of collar 763 facing boom 722. The second diameter may be larger than the first diameter. In some embodiments, the diameter may decrease in a direction of cooling airflow to funnel the airflow into thermal transfer device 738. For instance, in some embodiments, weak downwash may be used to cool the upper portion of motor assembly 730 instead of strong downwash from cooling channels 760. In such a case, the diameter of collar 763 may decrease in a downward direction such that the first diameter is larger than the second diameter (for example, as seen in FIG. 7C). In some embodiments, the first diameter and the second diameter may be substantially equal.

Figure 7B:
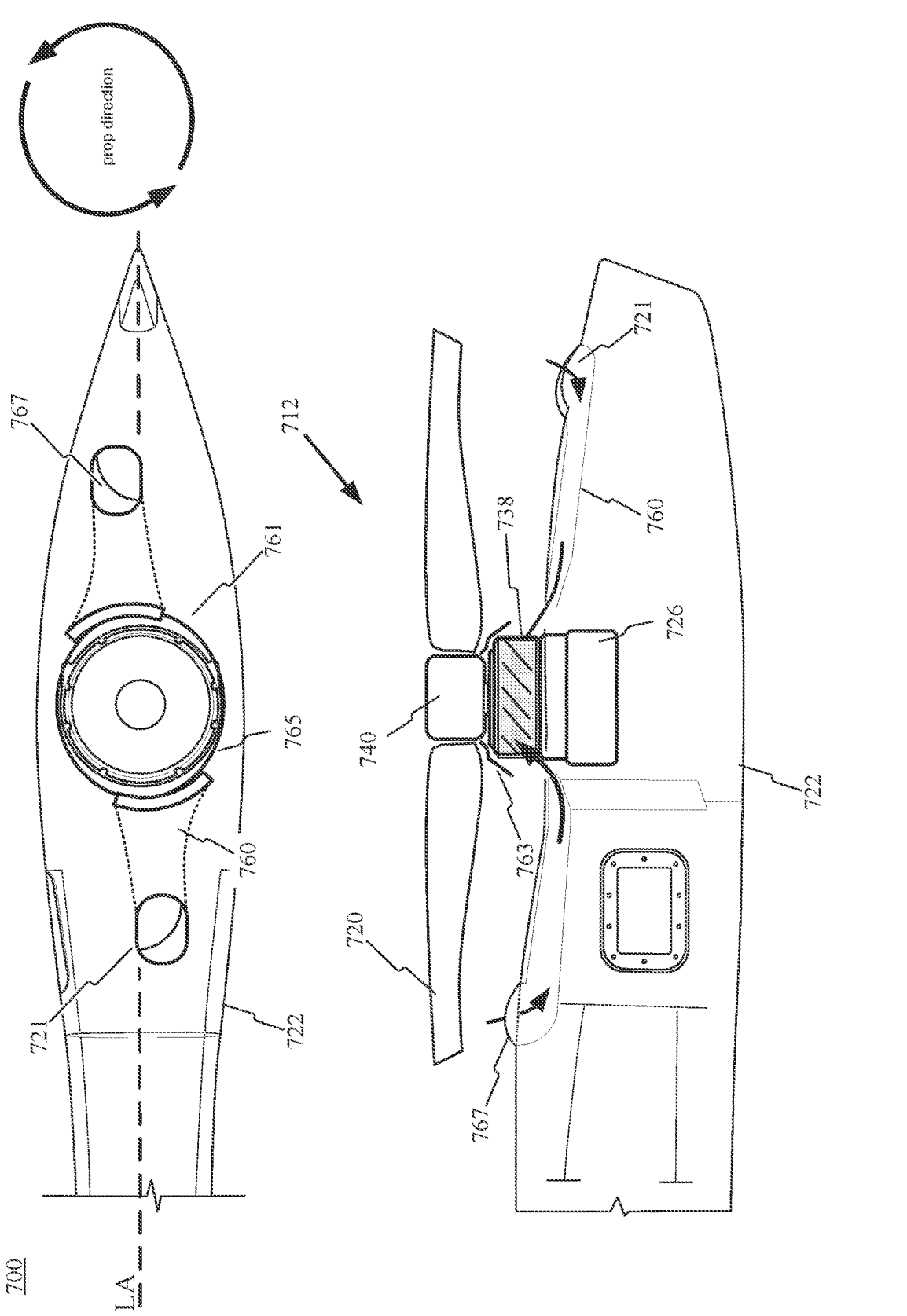
Figure 7C:
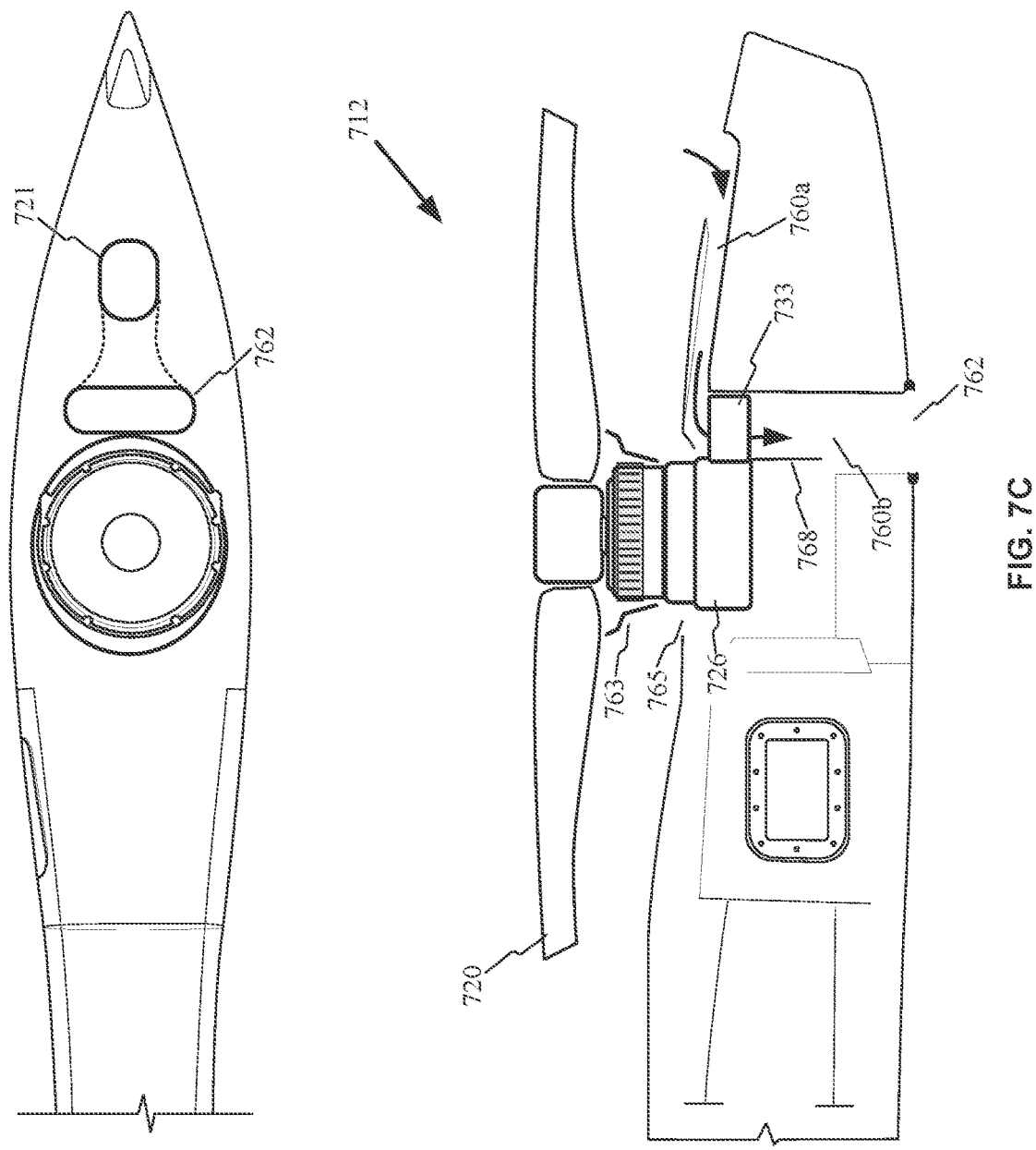
Figure 7D:
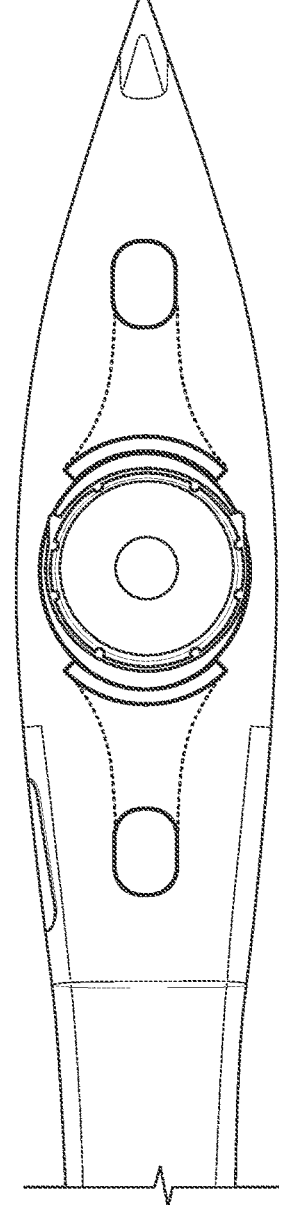
Figure 7D:
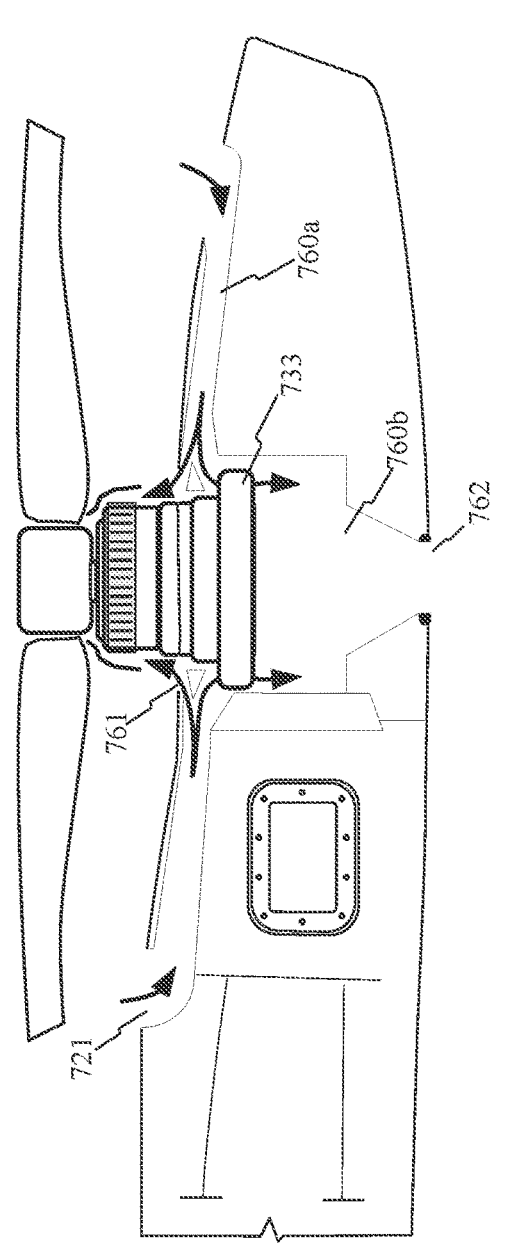

FIG. 7B illustrates a number of asymmetric features in an example VTOL aircraft 700, consistent with embodiments of the present disclosure. As shown in the top view of FIG. 7B, an air inlet 721 may be offset from a longitudinal axis LA of boom 722. For instance, as seen by the prop direction shown at the upper right corner of FIG. 7B, the direction of rotation of blades 720 may produce an asymmetric down-wash distribution that may be stronger at the offset location of air inlet 721 than it is at axis LA. Further, air inlet 721 or door 767 may be configured to capture a swirl component of the downwash. For instance, as illustrated, door 767 may comprise a scoop that is angle to face a swirl component of the downwash. The scoop may face away from a foreword direction of VTOL aircraft 700 to reduce drag during cruise. Alternatively, door 767 may be configured to blow outward or inward by the swirl component.

In some embodiments, additional components may exhibit an asymmetry with respect to longitudinal axis LA. For example, channels 760 or top outlets 761 may be offset from the axis. Further, the features of thermal transfer device 738 may be asymmetric with respect to a longitudinal or vertical axis. For example, if airflow exiting top outlets comprises a swirl or other horizontal component, cooling fins or heat exchange channels may be configured to correspond to the horizontal component for improved airflow.

FIG. 7C illustrates features for cooling an interior thermal transfer device in an example VTOL aircraft 700, consistent with embodiments of the present disclosure. Thermal transfer device 733 may comprise, e.g., a heat exchanger at a base of motor assembly 730, such as an inverter or other component. Thermal transfer device 733 may remain inside boom 722 during the transition between a stowed to lift configuration. However, internal cooling channel 760 may be designed for optimal airflow to thermal transfer device when it is in the lift configuration. For example, as lift propeller 712 is fully extended into the lift configuration as shown, thermal transfer device 733 may slide vertically upward so that an inlet side of thermal transfer device 733 meets an upper portion 760a of channel 760. This may more effectively channel cooling air into thermal transfer device rather than to some other cavity within boom 722. The air may exit from an outlet side of thermal transfer device 733 and be exhausted through, e.g., a bottom outlet 762. In some embodiments, bottom outlet 762 may comprise a door similar to those discussed above with respect to air inlets 721 and top outlets 761.

Further, boom 722 may comprise a lower channel 760b configured to direct airflow to bottom outlet 762. In some embodiments, lower channel 760b may surround thermal transfer device 733 to the extent possible while still allowing movement of motor assembly 730. This may result in a substantially enclosed channel. For example, if thermal transfer device 733 comprises, in the vertical direction, a first surface coupled to motor assembly 730 and one or more remaining surfaces that face away from motor assembly 730, lower channel 760b may be formed vertically along the one or more remaining surfaces. Stated another way, lower channel 760b may be open along a movement path of the surfaces connecting thermal transfer device 733 with the rest of motor assembly 730.

In some embodiments, a partition 768 may at least partially complete lower channel 760b. For example, partition 768 may be placed between thermal transfer device 733 and enclosure 726. Partition 768 may comprise one or more vertical slots (not shown) through which thermal transfer device 733 may connect to enclosure 726 of motor assembly 730. For example, the vertical slot may accommodate a coolant inlet, a coolant outlet, or a mounting component such as a bolt or bracket. When transitioning between stowed and lift configurations, the vertical slot of partition 768 may allow thermal transfer device 733 to move along with the rest of motor assembly 730 while remaining substantially enclosed within cooling channel 760b. Alternatively, partition 768 may comprise a baffle extending from an outlet side of thermal transfer device 733. Partition 768 may be short enough to remain inside boom 722 in the fully retracted position. For example, partition may extend substantially from a lower surface of motor assembly 730 to bottom outlet 762 in the fully retracted position. In some embodiments, partition may leave a gap in the fully extended position to allow airflow from other channels to be exhausted by bottom outlet 762. For example, airflow may enter into opening 765 via blades 720 or collar 763, and flow through a gap at partition 768 to reach bottom outlet 762.

In some embodiments, as discussed above with respect to FIGS. 7A-B, air may be channeled from both front and rear air inlets 721. Thus in some embodiments, thermal transfer device 733 may comprise another shape. For example, as illustrated in FIG. 7D and discussed below, a thermal transfer device may be configured to surround motor assembly 730.

Figure 7E:
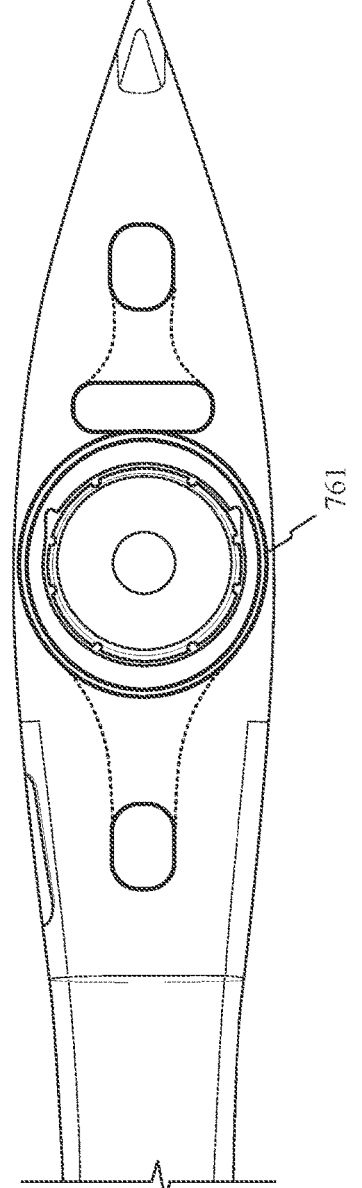
Figure 7E:
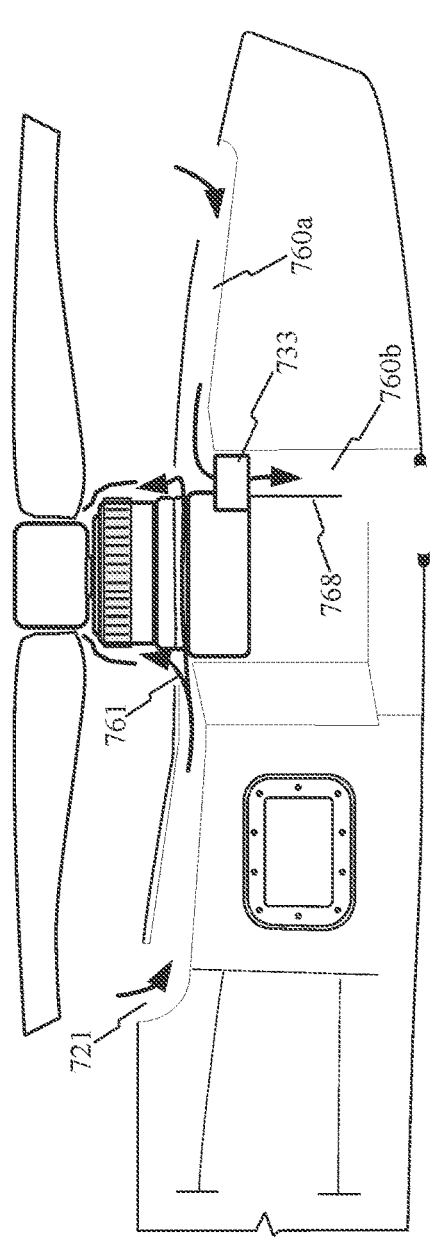

FIGS. 7D-E illustrate further examples of a VTOL aircraft 700, consistent with embodiments of the present disclosure. Embodiments according to FIGS. 7D-E may comprise both top outlets 761 and bottom outlets 762. For example, FIG. 7D illustrates an embodiment in which airflow from one or more cooling channels 760a may be divided between top outlet 761 and a bottom outlet 762 by, e.g., a dividing baffle as shown. In some embodiments comprising both front and back air inlets 721, thermal transfer device 733 may wrap around motor assembly 703 to receive air from both inlets.

Alternatively, as shown in FIG. 7E, different thermal transfer devices or different portions of motor assembly 730 may be cooled by dedicated flow channels. For example, a first (front) air inlet 721 may direct downwash to top outlet 761 to cool thermal transfer device 738. A second (rear) air inlet 721 may direct downwash through thermal transfer device 733 and out to bottom outlet 762.

Figure 7F:
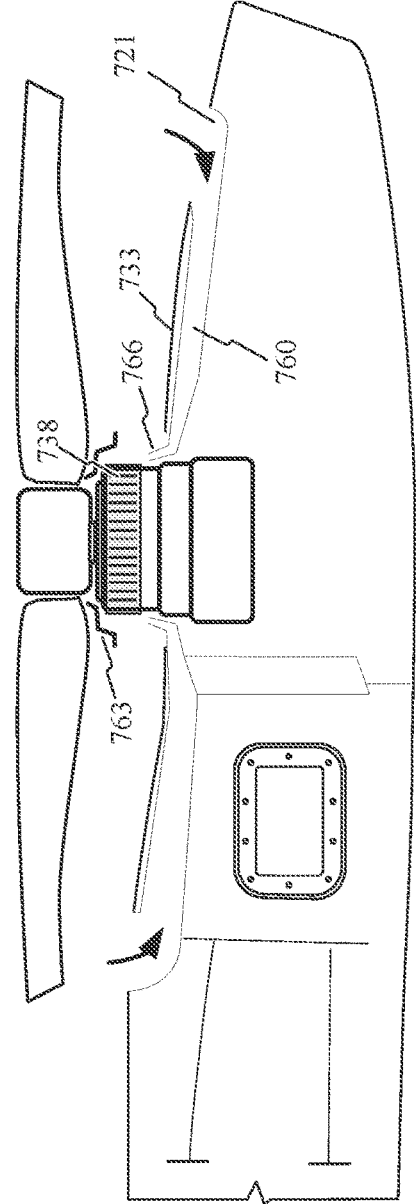
Figure 7F:
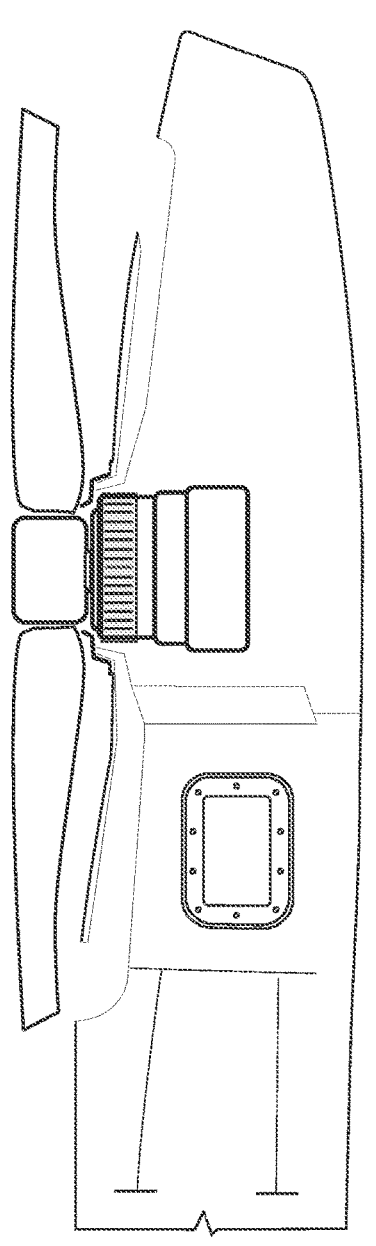

FIG. 7F illustrates a further example of a VTOL aircraft 700 in the lift and stowed configurations, consistent with embodiments of the present disclosure. Embodiments of FIG. 7F may comprise one or more nozzles 766 configured to project out from a boom surface 733. Nozzles 766 may comprise a plurality of individual outlets or may comprise a single, e.g., annular projection. Nozzles 766 may project to a height of an inlet side of thermal transfer device 738 when it is fully extended in the lift configuration. In this way, downwash from cooling channel 760 may be fed efficiently into thermal transfer device 738. The nozzles may be covered during cruise by collar 763. For example, instead of retracting into boom 722, collar 763 may be configured to rest on boom surface 733 during cruise as shown at the bottom of FIG. 7F. Collar 763 may comprise, e.g., a compliant lip or gasket configured to create a seal at boom surface 733.

Figure 7G:
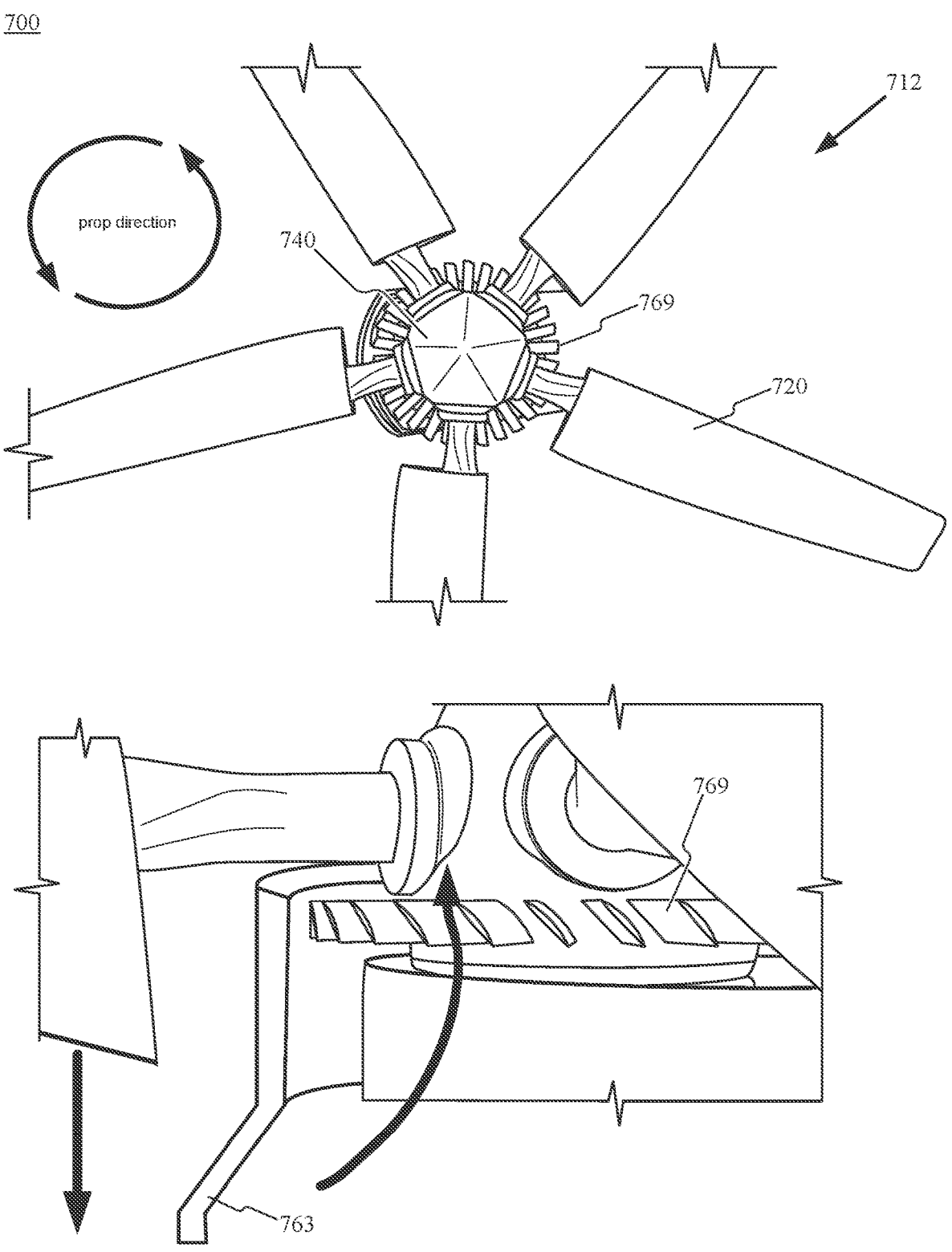

FIG. 7G illustrates further features in an example VTOL aircraft 700, consistent with embodiments of the present disclosure. Embodiments according to FIG. 7G may comprise a series of cooling blades 769 positioned at a central region of lift propeller 712. Cooling blades 769 may be configured to generate a cooling airflow to cool a portion of motor assembly 730 (not shown in FIG. 7G). For example, cooling blades 769 may be configured to direct airflow downward to strengthen the weak downwash at a central portion of lift propeller 712. Alternatively, as shown at the bottom of FIG. 7G, cooling blades may be tilted at a reverse angle from lift propeller blades 720. This may be used to improve upward airflow in combination with, e.g., cooling channels 760 and top outlets 761 discussed above. For example, cooling blades may draw air upward through collar 763 to improve airflow through a thermal transfer device 738 (not shown in FIG. 7G). Cooling blades 769 may be considerably smaller than propeller blades 720. For example, a radius of cooling blades 769 may be, e.g., less than 10%, 5%, or 2% of a radius of lift propeller blades 720.

Embodiments of the present disclosure may further be described with respect to the following clauses:

1. A lift apparatus for a vertical takeoff and landing (VTOL) craft, comprising:
   a lift propeller;
   a motor assembly configured to rotate the lift propeller to generate a lifting force; and
   a boom coupled to the motor,
   wherein the lift propeller is configured to be displaced vertically between a lift configuration and a stowed configuration, the lift propeller being displaced further from the boom in the lift configuration than in the stowed configuration.

2. The lift apparatus of clause 1, further comprising:
   an actuator configured to actively displace the lift propeller between the lift configuration and the stowed configuration.

3. The lift apparatus of clause 2, wherein the actuator is configured to displace the motor assembly along with the lift propeller between the lift configuration and the stowed configuration.

4. The lift apparatus of clause 2, wherein the actuator comprises a linear actuator.

5. The lift apparatus of clause 2, wherein the actuator comprises a hydraulic actuator.

6. The lift apparatus of clause 2, wherein the actuator comprises a rotary actuator configured to displace the lift propeller by rotating a mechanical linkage.

7. The lift apparatus of clause 1, wherein the lift propeller is configured to be passively displaced from the stowed configuration to the lift configuration by the lifting force.

8. The lift apparatus of clause 7, wherein the lift propeller is configured to be displaced from the lift configuration to the stowed configuration by gravity.

9. The lift apparatus of clause 7, further comprising a passive displacement device configured to displace the lift propeller into the stowed configuration by applying a passive force.

10. The lift apparatus of clause 9, wherein: the passive displacement device is configured hold the lift propeller in the stowed configuration when a combination of the passive force and a gravitational force exceeds the lifting force.

11. The lift apparatus of clause 9, wherein the lift propeller is configured to be displaced from the stowed configuration to the lift configuration when the lifting force exceeds a combination of the passive force and a gravitational force.

12. The lift apparatus of clause 9, wherein the passive displacement device comprises a spring.

13. The lift apparatus of clause 1, further comprising:
   a shaft configured to couple the motor assembly to the lift propeller, wherein the shaft comprises a linear translation section configured to allow linear translation of the lift propeller while transmitting torque to the lift propeller.

14. The lift apparatus of clause 13, wherein the linear translation section comprises a splined section.

15. The lift apparatus of clause 13, wherein the shaft is configured to slide vertically through the motor assembly to displace the lift propeller between the lift configuration and the stowed configuration.

16. The lift apparatus of clause 13, wherein the lift propeller comprises a sleeve configured to slide along the linear translation section to displace the lift propeller between the lift configuration and the stowed configuration.

17. The lift apparatus of clause 13, wherein the motor assembly comprises a bearing seal around the shaft.

18. The lift apparatus of clause 13, wherein the bearing seal comprises a spline nut.

19. The lift apparatus of clause 1, further comprising a sensor configured to sense that the lift propeller is in one of the lift configuration or the stowed configuration.

20. The lift apparatus of clause 1, wherein the lift propeller is configured to make a full rotation in the stowed configuration without colliding with another component of the eVTOL aircraft.

21. The lift apparatus of clause 1, further comprising:
   a shield surface;
   the lift propeller is located at an aft side of the shield surface; and
   at least part of the lift propeller is configured to be displaced above a level of the shield surface in the lift configuration and below the level of the shield surface in the stowed configuration.

22. The lift apparatus of clause 21, wherein the part of the lift propeller comprises a tip of a propeller blade.

23. The lift apparatus of clause 21, wherein the part of the lift propeller comprises a comprises a portion of a hub of the lift propeller.

24. The lift apparatus of clause 21, wherein the shield surface is a portion of the boom.

25. The lift apparatus of clause 21, wherein the shield surface comprises an air inlet configured to receive downwash from the lift propeller.

26. The lift apparatus of clause 1, wherein a first plane of rotation of the lift propeller when in the lift configuration is offset by an angle from a second plane of rotation of the lift propeller when in the stowed configuration.

27. The lift apparatus of clause 26, wherein the angle is at least 3 degrees.

28 The lift apparatus of clause 1, wherein a contour of a surface of the boom follows a contour of the lift propeller.

29. The lift apparatus of clause 1, wherein a portion of the lift apparatus is inside the boom in the stowed configuration and outside the boom in the lift configuration.

30. The lift apparatus of clause 29, wherein the portion of the lift apparatus comprises a lower surface of a hub of the lift propeller.

31. The lift apparatus of clause 29, wherein the portion of the lift apparatus comprises a portion of the motor assembly.

32. The lift apparatus of clause 1, wherein the lift propeller is displaced at least 3" between the lift configuration and the stowed configuration.

33. The lift apparatus of clause 1, wherein the lift propeller is displaced at least 10" between the lift configuration and the stowed configuration.

34 The lift apparatus of clause 1, wherein a gap between a part of the lift propeller and the boom in the lift configuration is at least 3 times larger than the gap between the part of the lift propeller and the boom in the stowed configuration.

35. The lift apparatus of clause 34, wherein the part of the lift propeller comprises an underside of a hub of the lift propeller.

36. The lift apparatus of clause 1, wherein the lift propeller is displaced by at least 5% of a propeller radius of the lift propeller between the lift configuration and the stowed configuration.

37. The lift apparatus of clause 1, wherein the lift propeller is displaced by at least 20% of a propeller radius of the lift propeller between the lift configuration and the stowed configuration 38. The lift apparatus of clause 1, wherein the motor assembly is configured to be displaced along with the lift propeller between the lift configuration and the stowed configuration.

39. The lift apparatus of clause 1, further comprising:
   a rail guide coupled to the motor assembly by a linear bearing, wherein the motor assembly is configured to move along the rail guide between the lift configuration and the stowed configuration.

40. The lift apparatus of clause 1, further comprising:
   a mechanical linkage coupled to the motor assembly, wherein the motor assembly is configured to be guided between the lift configuration and the stowed configuration by the mechanical linkage.

41. The lift apparatus of clause 1, wherein a rotation plane of the lift propeller in the lift configuration is not parallel to the rotation plane of the lift propeller in the stowed configuration.

42. The lift apparatus of clause 1, further comprising:
a damper configured to dampen vibrations as the lift propeller enters at least one of the lift configuration and the stowed configuration 43. The lift apparatus of clause 1, further comprising:
an air inlet; and
a thermal transfer device configured to be thermally coupled to the motor assembly,
wherein the air inlet is configured to receive downwash from the lift propeller and direct the downwash to the thermal transfer device.

44. The lift apparatus of clause 43, wherein the air inlet comprises a door configured to open in the lift configuration and close in the stowed configuration.

45. The lift apparatus of clause 43, wherein the air inlet is asymmetrical with respect to a longitudinal axis of the boom.

46. The lift apparatus of clause 43, further comprising:
an air outlet at a top side of the boom,
wherein the air outlet directs the downwash to the thermal transfer device in the lift configuration.

47. The lift apparatus of clause 43, wherein the thermal transfer device is configured to move upward in the lift configuration to meet a first portion of cooling channel inside the boom at an air inlet side of the thermal transfer device.

48. The lift apparatus of clause 47, further comprising a partition extending from an outlet side of the thermal transfer device, the partition forming part of a lower portion of the cooling channel.

49. The lift apparatus of clause 1, further comprising:
a collar surrounding a portion of the motor assembly, wherein the collar is configured to channel cooling air to a thermal transfer device of the motor assembly.

50. The lift apparatus of clause 49, wherein at least a portion of the collar is inside the boom in the stowed configuration and outside the boom in the lift configuration.

51. The lift apparatus of clause 1, further comprising:
a plurality of cooling blades at a central portion of the lift propeller.

52. The lift apparatus of clause 51, wherein the plurality of cooling blades is configured to direct air downward toward the motor assembly.

53. The lift apparatus of clause 51, wherein the plurality of cooling blades is configured to direct air upward away from the motor assembly.

54. The lift apparatus of clause 1, further comprising a nozzle projecting from a top surface of the boom, wherein the nozzle is configured to direct cooling air to an inlet side of a thermal transfer.

55. The lift apparatus of clause 54, further comprising:
a collar surrounding a portion of the motor assembly, wherein the collar is configured to cover the nozzle in the stowed configuration.

56. A method of operating a lift apparatus for a vertical takeoff and landing (VTOL) craft, comprising:
displacing a lift propeller vertically between a lift configuration and a stowed configuration, the lift propeller being mounted to a boom and being displaced further from the boom in the lift configuration than in the stowed configuration.

The invention claimed is:

1. A vertical takeoff and landing (VTOL) aircraft lift apparatus, comprising:
a lift propeller;
a motor assembly configured to rotate the lift propeller to generate a lifting force;
a support structure configured to support the motor assembly and the lift propeller; and
a shaft configured to couple the motor assembly to the lift propeller, the shaft comprising a linear translation section configured to allow linear translation of the lift propeller while transmitting torque to the lift propeller, wherein the shaft is configured to slide vertically through the motor assembly to displace the lift propeller vertically between a lift configuration and a stowed configuration, the lift propeller being vertically displaced between the lift configuration and the stowed configuration, the lift propeller being vertically displaced further from the support structure in the lift configuration than in the stowed configuration.

2. The lift apparatus of claim 1, further comprising:
a passive displacement device configured to displace the lift propeller and the shaft into the stowed configuration by applying a passive force.

3. The lift apparatus of claim 2, wherein the passive displacement device is located below the motor assembly.

4. The lift apparatus of claim 2, further comprising:
a thrust bearing located between the passive displacement device and the motor assembly.

5. The lift apparatus of claim 1, wherein the lift propeller and the shaft are configured to be passively displaced from the stowed configuration to the lift configuration by the lifting force.

6. The lift apparatus of claim 1, further comprising:
an actuator configured to actively displace the lift propeller and the shaft between the lift configuration and the stowed configuration.

7. The lift apparatus of claim 1, wherein the linear translation section comprises a splined section.

8. The lift apparatus of claim 1, further comprising:
a damper configured to dampen vibrations as the lift propeller enters at least one of the lift configuration and the stowed configuration.

9. The lift apparatus of claim 1, wherein the lift propeller is configured to make a full rotation in the stowed configuration.

10. The lift apparatus of claim 1, further comprising:
a sensor configured to sense that the lift propeller is in one of the lift configuration or the stowed configuration.

11. The lift apparatus of claim 1, further comprising:
a shield surface;
the lift propeller is located at an aft side of the shield surface; and
at least part of the lift propeller is configured to be displaced above a level of the shield surface in the lift configuration and below the level of the shield surface in the stowed configuration.

12. The lift apparatus of claim 11, wherein the part of the lift propeller comprises a tip of a propeller blade or a portion of a hub of the lift propeller.

13. The lift apparatus of claim 1, wherein the support structure comprises a boom.

14. The lift apparatus of claim 1, wherein the motor assembly comprises a bearing seal around the shaft.

15. The lift apparatus of claim 14, wherein the bearing seal comprises a spline nut.

16. The lift apparatus of claim 1, wherein a portion of the lift propeller is inside the support structure in the stowed configuration and outside the support structure in the lift configuration.

17. The lift apparatus of claim 1, wherein the lift propeller is displaced by at least 3 inches.

18. The lift apparatus of claim 1, wherein a gap between a part of the lift propeller and the support structure in the lift configuration is at least 3 times larger than the gap between the part of the lift propeller and support structure in the stowed configuration.

19. The lift apparatus of claim 1, wherein the lift propeller is displaced by at least 5% of a propeller radius of the lift propeller between the lift configuration and the stowed configuration.

20. A method of operating a vertical takeoff and landing (VTOL) aircraft lift apparatus, comprising:

displacing, by a shaft, a lift propeller vertically between a lift configuration and a stowed configuration, the lift propeller being mounted to a support structure and being displaced further from the support structure in the lift configuration than in the stowed configuration, wherein the shaft is configured to couple a motor assembly to the lift propeller, the shaft comprising a linear translation section configured to allow linear translation of the lift propeller while transmitting torque to the lift propeller, wherein the shaft is configured to slide vertically through the motor assembly to displace the lift propeller vertically between the lift configuration and the stowed configuration, the lift propeller being vertically displaced between the lift configuration and the stowed configuration, the lift propeller being vertically displaced further from the support structure in the lift configuration than in the stowed configuration.

* * * * *